United States Patent
Sloss

(10) Patent No.: US 9,664,087 B2
(45) Date of Patent: May 30, 2017

(54) EXHAUST HEAT RECOVERY SYSTEM WITH BYPASS

(75) Inventor: Clayton A. Sloss, Paris (CA)

(73) Assignee: WESCAST INDUSTRIES, INC., Brantford (CA)

( * ) Notice: Subject to any disclaimer, the term of this patent is extended or adjusted under 35 U.S.C. 154(b) by 1268 days.

(21) Appl. No.: 13/166,834

(22) Filed: Jun. 23, 2011

(65) Prior Publication Data

US 2012/0017575 A1 Jan. 26, 2012

Related U.S. Application Data

(60) Provisional application No. 61/366,730, filed on Jul. 22, 2010.

(51) Int. Cl.
*F01N 3/02* (2006.01)
*F01N 5/02* (2006.01)
(Continued)

(52) U.S. Cl.
CPC ............. *F01N 5/02* (2013.01); *F02D 9/10* (2013.01); *F28D 21/0003* (2013.01);
(Continued)

(58) Field of Classification Search
CPC .......... F01N 3/043; F01N 5/02; F01N 3/2006; F01N 3/2066; Y02T 10/16; F02M 25/0729; F02M 26/26; F02M 26/32
See application file for complete search history.

(56) References Cited

U.S. PATENT DOCUMENTS 3,050,935 A 8/1962 Eastwood
3,570,590 A 3/1971 Kofink
(Continued)

FOREIGN PATENT DOCUMENTS

EP 0913561 A2 5/1999
EP 1291509 A2 12/2003
(Continued)

OTHER PUBLICATIONS

First Office Action regarding China Application No. 2011800459604 dated Jul. 25, 2014. Translation provided by Kangxin Partners, P.C.

(Continued)

*Primary Examiner* — Mark Laurenzi
*Assistant Examiner* — Jason Sheppard
(74) *Attorney, Agent, or Firm* — Harness, Dickey & Pierce, P.L.C.

(57) ABSTRACT

An exhaust gas heat recovery system may include a housing, a valve member, and a heat exchanger. The housing may include an inlet, an outlet, a first exhaust gas pathway in communication with the inlet and outlet, and a second exhaust gas pathway in communication with the inlet and outlet. The valve member may be disposed within the housing and may be movable between first and second positions. In the first position, the valve member may allow fluid flow through the first exhaust gas pathway and substantially prevent fluid flow through the second exhaust gas pathway. In the second position, the valve member may allow fluid flow through the second exhaust gas pathway. The heat exchanger may be in communication with the second exhaust gas pathway and may include a conduit containing a fluid in thermal communication with exhaust gas when the valve member is in the second position.

33 Claims, 12 Drawing Sheets

(51) Int. Cl.
  *F02D 9/10* (2006.01)
  *F28D 21/00* (2006.01)
  *F28F 27/02* (2006.01)
  *F16K 11/052* (2006.01)
  *F02M 26/26* (2016.01)
  *F02G 5/02* (2006.01)

(52) U.S. Cl.
  CPC .......... *F28F 27/02* (2013.01); *F01N 2240/02* (2013.01); *F01N 2240/36* (2013.01); *F01N 2260/024* (2013.01); *F01N 2410/02* (2013.01); *F02G 5/02* (2013.01); *F02M 26/26* (2016.02); *F16K 11/0525* (2013.01); *F28F 2250/06* (2013.01); *F28F 2265/26* (2013.01); *Y02T 10/16* (2013.01)

(56) References Cited

U.S. PATENT DOCUMENTS

| | | |
|---|---|---|
| 3,939,813 A | 2/1976 | Harrow et al. |
| 4,380,246 A | 4/1983 | Casale et al. |
| 4,593,749 A | 6/1986 | Schatz |
| 4,630,445 A | 12/1986 | Parker |
| 5,033,264 A | 7/1991 | Cabral |
| 5,184,462 A | 2/1993 | Schatz |
| 5,305,787 A * | 4/1994 | Thygesen ............ F16K 15/033 137/527 |
| 5,499,501 A | 3/1996 | Kato et al. |
| 6,141,961 A | 11/2000 | Rinckel |
| 6,702,190 B1 | 3/2004 | Nohl et al. |
| 6,758,038 B2 | 7/2004 | Ueno et al. |
| 6,942,027 B2 | 9/2005 | Klotten et al. |
| 6,955,213 B2 | 10/2005 | Stonehouse et al. |
| 7,032,577 B2 | 4/2006 | Rosin et al. |
| 7,056,173 B1 | 6/2006 | Shull et al. |
| 7,077,114 B2 | 7/2006 | Husges |
| 7,168,419 B2 | 1/2007 | Rosin et al. |
| 7,581,533 B1 * | 9/2009 | Moran ..................... 123/568.12 |
| 7,743,816 B2 | 6/2010 | Mercz et al. |
| 7,823,798 B2 | 11/2010 | Le Lievre |
| 7,836,945 B2 | 11/2010 | Speer |
| 2003/0011211 A1 | 1/2003 | Booher |
| 2003/0192606 A1 | 10/2003 | Heckt |
| 2004/0182440 A1 | 9/2004 | Watts et al. |
| 2004/0251012 A1 | 12/2004 | Bush et al. |
| 2005/0133202 A1 | 6/2005 | Jorgensen et al. |
| 2005/0199381 A1 | 9/2005 | Mercz et al. |
| 2006/0288694 A1 | 12/2006 | Hayashi |
| 2008/0115487 A1 | 5/2008 | Harada et al. |
| 2008/0236913 A1 | 10/2008 | Ichimoto |
| 2009/0038302 A1 | 2/2009 | Yamada et al. |
| 2009/0049832 A1 | 2/2009 | Hase |
| 2009/0056909 A1 | 3/2009 | Braun |
| 2009/0235654 A1 * | 9/2009 | Kobayashi et al. ............ 60/324 |
| 2010/0089043 A1 | 4/2010 | Dittmann et al. |
| 2010/0146954 A1 | 6/2010 | Sloss et al. |
| 2010/0186397 A1 * | 7/2010 | Emrich ................... F02M 26/32 60/320 |
| 2010/0199957 A1 * | 8/2010 | Furukawa ............... F02M 26/39 123/568.12 |

FOREIGN PATENT DOCUMENTS

| | | |
|---|---|---|
| EP | 1431527 A1 | 6/2004 |
| EP | 1475532 A2 | 11/2004 |
| EP | 1739298 A2 | 1/2007 |
| EP | 1748179 A1 | 1/2007 |
| EP | 1748179 A1 | 1/2007 |
| FR | 2755727 A1 | 5/1998 |
| FR | 2755727 A1 | 5/1998 |
| FR | 2859239 A1 | 3/2005 |
| FR | 2924162 A1 | 5/2009 |
| FR | 2924162 A1 | 5/2009 |
| GB | 192489 | 2/1923 |
| GB | 1300948 | 12/1972 |
| GB | 1473153 A | 5/1977 |
| GB | 2420593 | 5/2006 |
| GB | 2441588 A | 12/2008 |
| JP | 7-269332 | 10/1995 |
| JP | 2009-091947 A | 4/2009 |
| JP | 2010024872 A | 2/2010 |
| WO | 00/28203 A1 | 11/1999 |
| WO | 01/50047 A1 | 7/2001 |
| WO | 03/001114 A1 | 1/2003 |
| WO | 2004097192 A2 | 11/2004 |
| WO | WO-2004097192 A2 | 11/2004 |
| WO | WO-2009/151681 A2 | 12/2009 |

OTHER PUBLICATIONS

International search report and written opinion dated Dec. 5, 2011 from the international priority application PCT/IB2011/001701.
Office Action regarding U.S. Appl. No. 12/636,123 mailed Nov. 5, 2011.
Extended European Search Report regarding Application No. 09830540.1, dated Nov. 27, 2012.
First Japanese Office Action regarding Application No. 2013-520232, dated Mar. 3, 2015. Translation provided by Maeda &Suzuki Patent Co., Ltd.
International Search Report regarding Application No. PCT/IB2011/001701, mailed Dec. 5, 2011.
Written Opinion of the International Searching Authority regarding Application No. PCT/IB2011/001701, mailed Dec. 5, 2011.

* cited by examiner gas path ▪▪▪▪▪▶ gas path ▪▪▪▪▪▶

EXHAUST HEAT RECOVERY SYSTEM WITH BYPASS

CROSS-REFERENCE TO RELATED APPLICATIONS

This application claims the benefit of U.S. Provisional Application No. 61/366,730, filed on Jul. 22, 2010. The entire disclosure of the above application is incorporated herein by reference.

FIELD OF THE INVENTION

The present disclosure relates to a heat recovery system, and more particularly, to an exhaust heat recovery system with a bypass flow path.

BACKGROUND

This section provides background information related to the present disclosure and is not necessarily prior art.

A significant amount (e.g., approximately one-third) of energy in fuel consumed by an internal combustion engine is lost as heat rejected through an exhaust system associated with the internal combustion engine. It is desirable to recover this heat or thermal energy from exhaust gas flowing through the exhaust system for various purposes. For example, such recovered thermal energy can be used to heat vehicle fluids to provide faster passenger cabin warm-up and windshield defrosting. Additionally or alternatively, the recovered thermal energy can be used to improve fuel economy by reducing friction and viscous losses in the vehicle lubrication systems, for example.

SUMMARY

This section provides a general summary of the disclosure, and is not a comprehensive disclosure of its full scope or all of its features.

The present disclosure provides an assembly disposed in an exhaust gas stream that may selectively recover thermal energy from the exhaust gas stream. The assembly may include a valve element that can be controlled to regulate a flow of exhaust gas through either or both of a heat exchanger flow path and a bypass flow path that bypasses the heat exchanger flow path. The valve element may be controlled by an external actuator and may be positioned depending upon operating conditions of the exhaust gases, working limits of the heat exchanger, and/or demand for thermal energy recovery, for example. The heat exchanger flow path and the bypass flow path may terminate in a common collector which has an outlet to connect with the remainder of the exhaust system. The assembly can be placed at any location within the exhaust stream. Locations relatively close to the engine may have potential to provide the heat exchanger with the hottest exhaust gas temperatures, which may increase an amount of thermal energy that the assembly is able to recover.

The assembly can be used with an internal combustion engine, such as in an automobile, for example, or any other combustion engine. Recovered thermal energy may be used for rapid warm-up of engine coolant to aid in faster windshield defrosting, improved HVAC (heating, ventilation and air conditioning) system performance, and/or to improve fuel economy by reducing viscous losses through heating of various fluid systems in the vehicle, such as engine oil and transmission fluid, for example. Further uses of the recovered thermal energy may include steam generation for power generation (e.g., in Rankine cycle systems). The heat recovery system could also be a part of a thermoelectric energy conversion system that may convert heat energy from exhaust gas into useful electrical energy.

During some periods of operation of the engine, it may not be desirable to extract energy from the exhaust system. During these periods it may be desirable to route exhaust gases through a bypass flow path. During other operating conditions, when heat extraction is desirable, some or all of the exhaust gas may be diverted through a flow path including a heat exchanger. The routing of exhaust gas may be controlled in such a way that it is throttled or adjusted to a certain percentage of flow through the bypass and heat exchanger flow paths. In some embodiments, a control module may send electronic signals to an actuator driving the valve assembly to control and adjust a position of the valve assembly based on operating conditions and parameters of various engine and vehicle systems and subsystems. In some embodiments, a thermally controlled actuator may be used to control the position of the valve assembly. Such a thermally controlled actuator could include a wax valve, a thermostat device, and/or any other device configured to actuate the valve assembly in response to exhaust gases, coolant and/or any other fluid reaching one or more predetermined temperatures.

Regulation of the exhaust flows through the bypass and heat exchanger flow paths allows for control over the amount of heat energy recovery or extraction from the exhaust gases. Heat energy recovery from the exhaust gas may be desirable following a start-up of the engine, for example. Under cold start-up conditions, it may be necessary to maximize heat extraction from the exhaust gases in order to warm up the engine coolant, to speed up windshield defrost, and/or heat-up a passenger compartment of the vehicle, for example. Accelerated heat-up of the engine coolant also decreases the time-averaged engine oil viscosity, resulting in lower viscous losses in the moving parts of the engine and reduced fuel consumption. Alternatively, under high speed and/or high load engine operating conditions, it may be desirable to limit the thermal extraction from the exhaust gases so that excessive heat does not have to be carried and rejected by the engine/vehicle cooling system.

In some embodiments, the assembly of the present disclosure may transfer heat from exhaust gases to additional or alternative vehicle fluids, such as a hydraulic fluid or a lubricant for an engine, a transmission, an axle, and/or a differential, for example, and/or any other fluid.

Control of the heat extraction can also be employed for other reasons in a vehicle. For example, if the heat extraction system is upstream of an emissions device such as a catalytic converter or lean NOx trap, then it can be desirable to maintain the temperature of the exhaust gases entering that emissions device within a specific temperature range. The temperature range may depend upon the conversion efficiency of the emissions device and service temperature limits for long life and durability of the device. In this type of application it may be necessary to reduce or prevent heat extraction from the exhaust gases when the emissions device is below operating temperature so that it heats up as quickly as possible to an optimal operating temperature. Likewise, it can be necessary to extract heat energy from the exhaust gases, even under conditions of high engine speed and/or load, to keep the operating temperature of an emissions management device below an upper operating temperature threshold to prevent damage and/or maintain the efficiency of the emissions management device.

In some forms, the present disclosure provides an exhaust gas heat recovery system that may include a housing, a valve member, and a heat exchanger. The housing may include an inlet, an outlet, a first exhaust gas pathway in communication with the inlet and the outlet, and a second exhaust gas pathway in communication with the inlet and the outlet. The valve member may be disposed within the housing and may be movable between a first position and a second position. In the first position, the valve member may allow fluid flow through the first exhaust gas pathway and substantially prevent fluid flow through the second exhaust gas pathway. In the second position, the valve member may allow fluid flow through the second exhaust gas pathway. The heat exchanger may be in communication with the second exhaust gas pathway and may include a conduit having a fluid flowing therein. The fluid may be in thermal communication with exhaust gas in the heat exchanger when the valve member is in the second position and may be substantially thermally isolated from the exhaust gas when the valve member is in the first position. The heat exchanger may be substantially fluidly isolated from the first exhaust gas pathway when the valve member is in the first portion.

In other forms, the present disclosure provides an exhaust gas heat recovery system that may include a housing, a valve member, and a heat exchanger. The housing may include an inlet, an outlet, a first exhaust gas pathway in communication with the inlet and the outlet, and a second exhaust gas pathway in communication with the inlet and the outlet. The valve member may be disposed within the housing and may be movable between a first position allowing fluid flow through the first exhaust gas pathway and a second position allowing fluid flow through the second exhaust gas pathway. The heat exchanger may be in communication with the second exhaust gas pathway and may include a conduit having a fluid flowing therein. The fluid may be in thermal communication with exhaust gas in the heat exchanger when the valve member is in the second position. The housing may include a first stop member contacting a leading end of the valve member when the valve member is in the first position and a second stop member contacting a trailing end of the valve member when the valve member is in the first position. The leading end may contact a surface of the first stop member that faces generally away from the first exhaust gas pathway.

In some embodiments, the first exhaust gas pathway may be substantially aligned with the inlet and the outlet to define a substantially linear flow path therethrough. In some embodiments, the valve member may at least partially define a substantially U-shaped flow path through the heat exchanger when the valve member is in the second position, the valve member defining an inlet into the U-shaped flow path and an outlet out of the U-shaped flow path when the valve member is in the second position.

In some embodiments, the inlet and outlet may be in communication with an exhaust manifold associated with an engine and substantially all of the exhaust gas that flows through the exhaust manifold may flow through the inlet and the outlet.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

Figure 1:
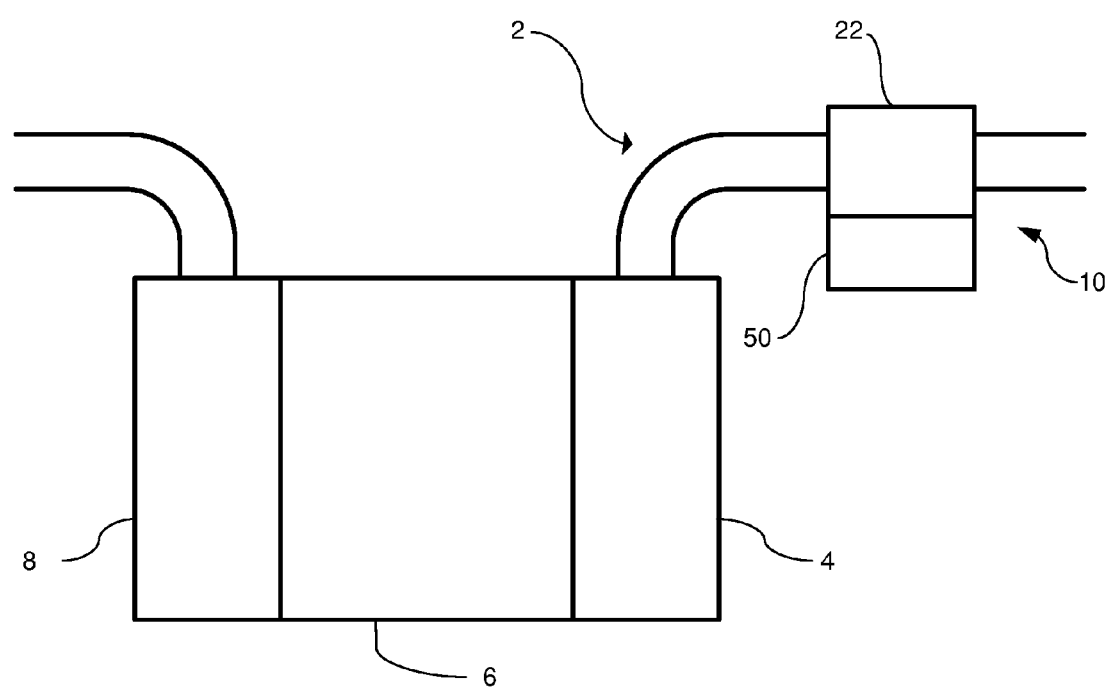
FIG. 1 is a schematic representation of an engine and exhaust system having an exhaust gas heat recovery system according to the principles of the present disclosure.
Figure 2:
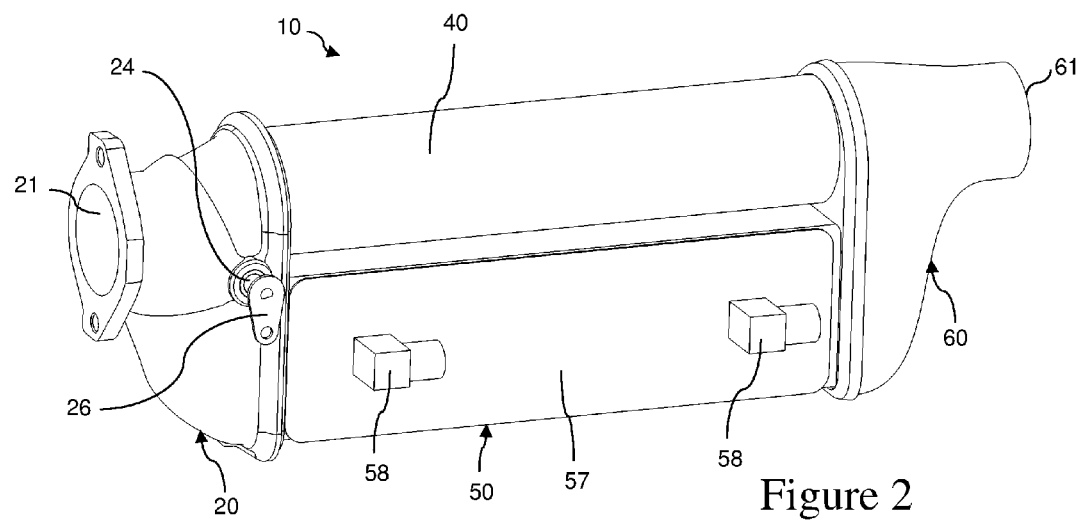
FIG. 2 is a perspective view of an exhaust gas heat recovery system according to the principles of the present disclosure.
Figure 3:
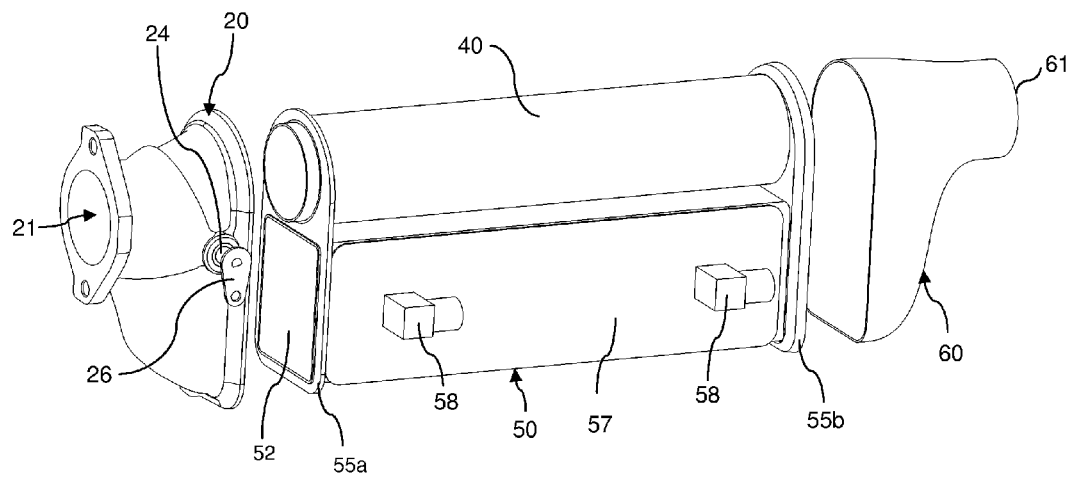
FIG. 3 is a partially exploded perspective view of the exhaust gas heat recovery system of FIG. 2.
Figure 4:
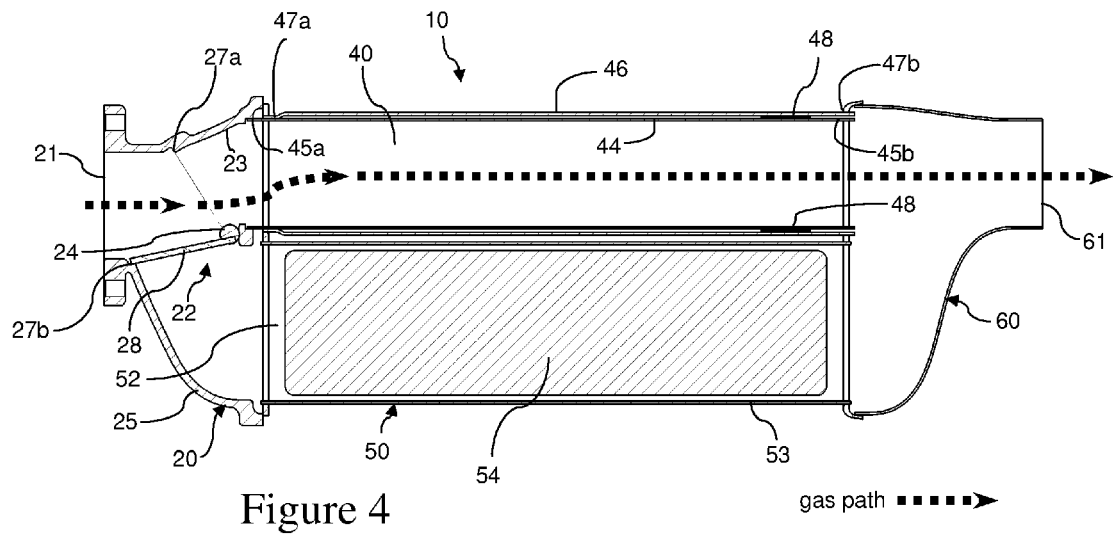
FIG. 4 is a cross-sectional view of the exhaust heat recovery system of FIG. 2 including a valve element shown in a bypass position.

Example embodiments will now be described more fully with reference to the accompanying drawings. It should be understood that throughout the drawings, corresponding reference numerals indicate like or corresponding parts and features. The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, and devices, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-5, an exhaust gas heat recovery system (EGHR system) 10 is provided and may include a valve assembly 22, a bypass conduit 40, a heat exchanger assembly 50, and an outlet collector 60. The EGHR system 10 may be disposed in an exhaust gas flow path of an engine exhaust system 2 at any suitable location between an exhaust manifold 4 associated with an engine 6 and a tailpipe through which exhaust gas is discharged into ambient air. In some embodiments, the EGHR system 10 may be in direct or indirect fluid communication with a catalytic converter, an $NO_x$ trap, or the exhaust manifold 4, for example, or any other exhaust system component. The EGHR system 10 may be disposed in a tunnel or channel (not shown) in the underside of a vehicle where the exhaust system 2 may be routed. In some embodiments, the EGHR system 10 may receive substantially all of the exhaust gas discharged from the engine 6 and the exhaust manifold 4. In other embodiments, an exhaust gas recirculation (EGR) device may be disposed between engine 6 and the EGHR system 10. In such embodiments, the EGHR system 10 may receive substantially all of the exhaust gas that is not recirculated from the EGR device back to an intake manifold 8. In some embodiments, the EGR device may be disposed downstream of the EGHR system 10.

Figure 5:
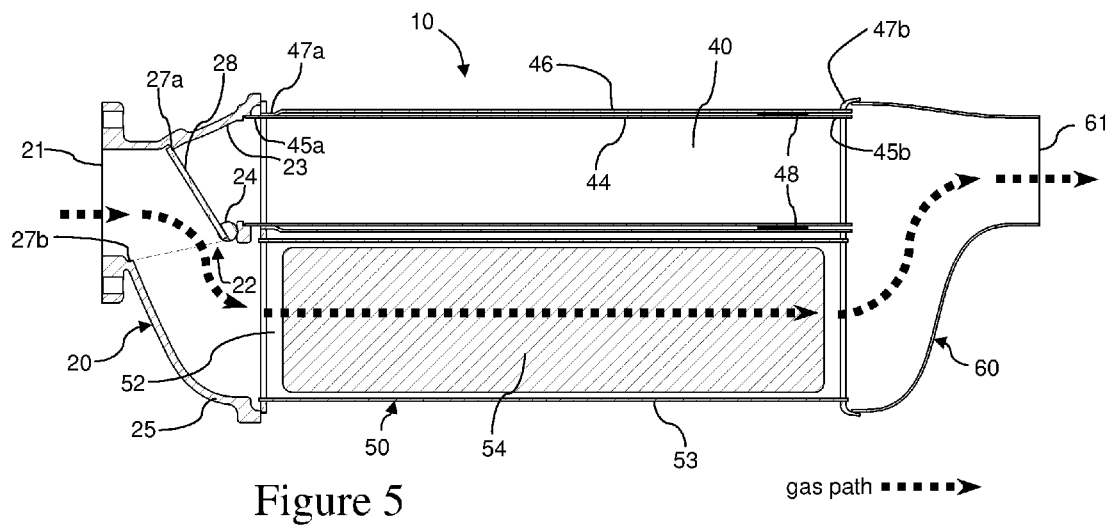
FIG. 5 is a cross-sectional view of the exhaust heat recovery system of FIG. 2 including the valve element shown in a heat-exchange position.
Figure 6:
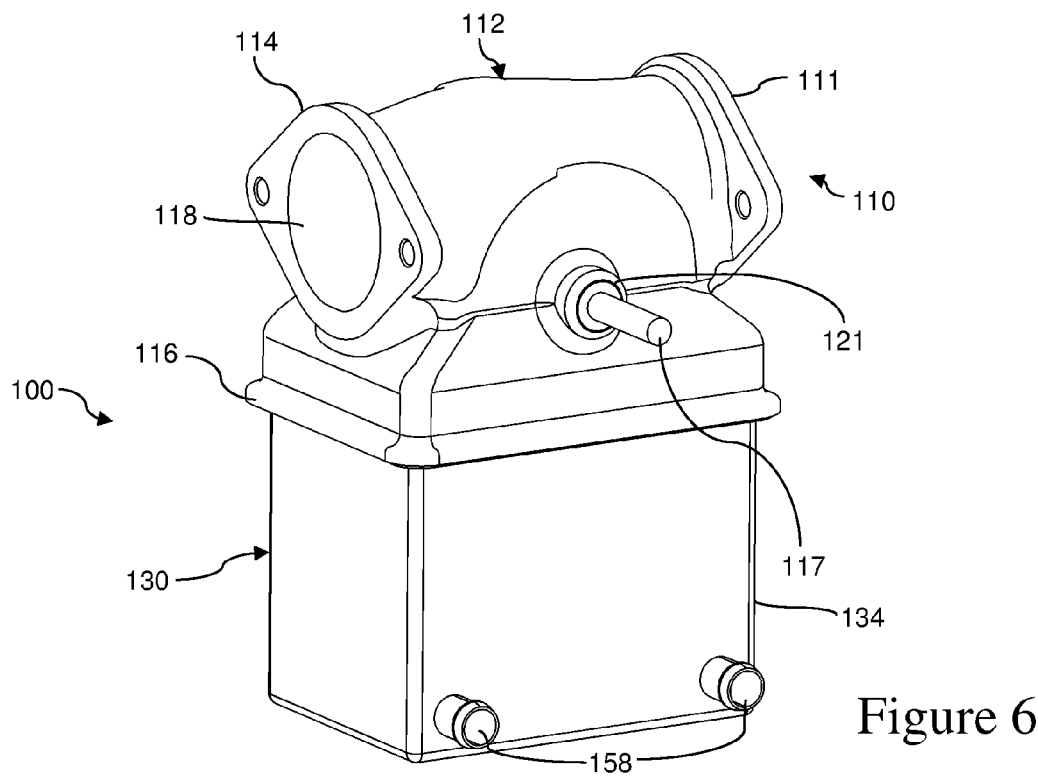
FIG. 6 is a perspective view of another exhaust heat recovery system according to the principles of the present disclosure.

As will be subsequently described, the valve assembly 22 may be movable between a bypass position (FIG. 4) and a heat-exchange position (FIG. 5). In the heat-exchange position, exhaust gas may flow through the heat exchanger assembly 50 and transfer heat to a coolant, working fluid, or other fluid therein. In the bypass position, the exhaust gas may bypass the heat exchanger assembly 50 and flow through the bypass conduit 40 and exit the EGHR system 10 through the outlet collector 60 without transferring any heat (or any significant amount of heat) between the exhaust gas and the heat exchanger assembly 50. While not specifically shown, the valve assembly 22 can be positioned anywhere between the bypass position and the heat-exchange position to allow a first portion of the exhaust gas entering the EGHR system 10 to bypass the heat exchanger assembly 50 and a second portion of the exhaust gas to flow through the heat exchanger assembly 50. In this manner, the EGHR system 10 can adjust and optimize an amount of heat transfer between the exhaust gas and the fluid in the heat exchanger assembly 50.

The valve assembly 22 may regulate exhaust gas flow through the EGHR system 10 downstream of the inlet 21. The valve assembly 22 may include a valve housing or body 20, a valve shaft 24, and a valve plate or diverter plate 28. The valve body 20 may house the shaft 24 and diverter plate 28 and may be shaped so as to control and regulate the exhaust gas flow through the bypass conduit 40 and heat exchange flow path 52. The valve body 20 may include an inlet 21, a bypass portion 23, and a heat-exchange portion 25. The bypass portion 23 may be attached to the bypass conduit 40 for fluid communication therebetween. Similarly, the heat-exchange portion 25 may be attached to the heat exchanger assembly 50 for fluid communication therebetween.

The diverter plate 28 may be a "butterfly" type (e.g., extending in both directions from the valve shaft 24) or the diverter plate 28 may be a "flap" type, extending from only one side of the valve shaft 24. The valve shaft 24 may be supported by bushing or bearing surfaces on both ends or it may be cantilevered from a single end. The choice of bushing and/or bearing material may depend on the application temperature and the material of the valve shaft 24 and valve body 20. An actuator may rotate the valve shaft 24 to move the diverter between the bypass and heat-exchange positions. Motion of the actuator may be controlled by a control module and may be transferred to the valve shaft 24 by means of an actuator arm 26 or any other suitable mechanism.

During operation of the EGHR system 10, the exhaust gases enter into the valve body 20 and are directed into the bypass conduit 40 and/or the heat exchanger assembly 50, depending on the position of the valve diverter plate 28. First and second stop or seat features 27a, 27b may be formed into the valve body 20 to reduce or prevent unwanted leakage between the valve body 20 and the diverter plate 28 when the diverter plate 28 is in the heat-exchange and bypass positions, respectively. The seat features 27a and 27b for the diverter plate 28 also provide positive stops to limit the rotation of the diverter plate 28 about the valve shaft 24. This may allow some embodiments to employ a simple actuator without position control (or without fine position control). For example, in applications that do not include modulation of the valve assembly 22, a low-cost two-position vacuum actuator may be used.

The inlet 21 of the valve assembly 22 and an outlet 61 of the outlet collector 60 may be substantially aligned with the bypass conduit 40. Such alignment may minimize back pressure through the EGHR system 10, as the bypass conduit 40 may be designed to accommodate the entire mass flow rate of exhaust gas that is discharged from the engine during peak engine operating capacity and engine speed. The heat exchange flow path 52 through the heat exchanger assembly 50 may be offset as compared to the inlet 21 and the outlet 61 without causing detrimental pressure losses because the mass flow rate of exhaust gases discharged from the engine 6 may be well below a peak engine operating flow rate under many circumstances in which it is desirable to route exhaust gas through the heat exchanger assembly 50. In an exemplary embodiment, the highest mass flow rate during heat exchange mode for a current inline, spark ignition, naturally aspirated, four cylinder passenger car engine may be about 200 kilograms per hour (kg/hr). However, the same engine may have a maximum mass flow rate at peak operating conditions of over four-hundred-twenty kilograms per hour (420 kg/hr), which may flow substantially unimpeded through the bypass conduit 40.

Due to the modulation of the hot exhaust gas flow, it is possible that substantial temperature gradients can develop between the bypass conduit 40 and the heat exchange flow path 52. This is especially true when the engine 6 is operating at high mass flow rates and the exhaust gas is diverted away from the heat exchanger assembly 50 and routed only through the bypass conduit 40. Under these conditions, the thermal expansion of the material forming the bypass conduit 40, could be much larger than the materials forming the heat exchanger assembly 50, causing large thermal stresses in the assembly. To accommodate the differing amounts of thermal expansion, the bypass conduit 40 may include a dual wall structure including an inner tube 44 that shields an outer tube 46 from large temperature excursions. The inner tube 44 may be fixedly joined to the valve body 20 at a first end 45a. A second end 45b of the inner tube 44 may be allowed to expand or contract axially without passing loads onto the rest of the assembly. A spacer 48 may radially space the inner tube 44 apart from the outer tube 46. The spacer 48 may be formed from a compliant material such as wire mesh, for example. The outer tube 46 may be welded at first and second ends 47a, 47b to form a gas connection between the valve body 20 and outlet collector 60. This construction may reduce interaction between the thermal expansion of the hotter inner tube 44 and the structural constraint of the cooler outer tube 46.

The heat exchanger assembly 50 may include a housing 53 and a heat exchanger core 54. The housing 53 may define the heat exchange flow path 52 and may or may not include a separate heat exchanger core attachment plate 57. The coolant, working fluid, or other fluid may be routed through the heat exchanger core 54 via coolant fittings 58.

In order to minimize a packaging volume of the EGHR system 10, the outer tube 46 and the housing 53 for the heat exchanger assembly 50 may be welded to first and second end plates 55a and 55b, respectively. The welds may be disposed on a side of the first and second end plates 55a, 55b that faces away from a central portion of the outer tube 46 to facilitate the welding process (i.e. to avoid welding torch access restrictions). This allows the bypass conduit 40 and the heat exchanger assembly 50 to be located in very close proximity without concern for weld access during construction. The end plates 55a, 55b may then be welded to the valve body 20 and the outlet collector 60, respectively, in separate welding operations. This provides for a compact design without compromising on weld access and allows for a robust manufacturing process. In addition, this construction makes the assembly modular so that the base design can be adapted to multiple applications by changing the length of the heat exchanger core 54, heat exchanger housing 53, and bypass conduit 40 accordingly.

With reference to FIGS. 6-9, another EGHR system 100 is provided and may include a valve assembly 110 and a heat exchanger assembly 130. Like the EGHR system 10, the EGHR system 100 may receive exhaust gas from the exhaust manifold 4 and engine 6. The EGHR system 100 may include fewer components than the EGHR system 10, which may simplify manufacturing and assembly of the EGHR system 100. Furthermore, the EGHR system 100 may reduce or minimize backpressure losses during a bypass mode due to a short length of the bypass circuit. Durability of the EGHR system 100 is also improved because an interface of the valve assembly 110 and the heat exchanger assembly 130 is subjected to relatively low and uniform temperatures during operation and avoids the thermally induced strains associated with a system having longer bypass circuits and constrained structures.

The valve assembly 110 may include a valve housing 112, a valve shaft 117, and a valve diverter plate 119. The valve housing 112 may include an inlet flange 114, an outlet flange 111, a bypass conduit 113, and a heat exchange conduit 115. An inlet opening 118 may extend through the inlet flange 114, and an outlet opening 120 may extend through the outlet flange 111. The bypass conduit 113 may be formed to provide a generally straight or linear flow path through the EGHR system 100 when the diverter plate 119 is in the bypass position. The bypass conduit 113 may include very little or no variation in cross-sectional area, constrictions or turns. This simple and straight geometry of the bypass conduit 113, along with the relatively short length of the bypass conduit 113 results in very little pressure drop or restriction of flow therethrough.

One or more exhaust components can be attached to the inlet flange 114 and/or the outlet flange 111. The valve shaft 117 may extend through the valve housing 112 generally between the bypass conduit 113 and the heat exchange conduit 115 and may be rotatably supported by a bearing housing 121.

The valve diverter plate 119 may be attached to the valve shaft 117 for rotation between a bypass position (FIG. 8) in which exhaust gas flows through the bypass conduit 113 and a heat-exchange position (FIG. 9) in which exhaust gas flows through the heat exchange conduit 115. Rotation of the valve shaft 117 may be controlled by an external actuator. The use of a 'butterfly' or balanced diverter plate 119 in the second embodiment is an advantage because the net torque in a given position is lower than a single 'flap' style diverter plate of similar effective diverting area. If a lower torque is needed to overcome torques applied by the flow of exhaust gas and control the position of the diverter plate 119, then a smaller and/or lower cost actuator can be employed to control the valve diverter plate 119 position.

The valve housing 112 may be manufactured as a single, integrally formed component and may be cast or fabricated from wrought materials. A material from which the valve housing 112 is formed may be selected depending on a range of temperatures and/or other operating conditions that the EGHR system 100 may be operating under in a given application. For applications in which the material of the valve housing 112 will reach temperatures of about eight-hundred degrees Celsius (800° C.) or less during operation of the EGHR system 100, the valve housing 112 may be formed from a ferritic cast iron, for example. For applications in which the material of the valve housing 112 will reach temperatures of more than eight-hundred degrees Celsius (800° C.) during operation of the EGHR system 100, the valve housing 112 may be formed from austenitic cast iron or a heat-resistant steel, for example. The valve shaft 117 and valve diverter plate 119 may be formed from a steel alloy such as a heat-resistant wrought steel, for example, and/or any other suitable material.

The heat exchanger assembly 130 may include a heat exchanger core 132 defining generally parallel exhaust gas flow channels 138 in communication with the heat exchange conduit 115 in the valve housing 112. The exhaust gas flow channels 138 may direct the exhaust gases in a two-pass, generally U-shaped flow path when the diverter plate 119 is in the heat-exchange position. This allows the exhaust gas to contact more surface area of the entire heat exchanger core 132. A first portion 139a of the exhaust gas flow channels 138 may be formed by a part of the heat exchanger core 132 disposed upstream of the diverter plate 119 and the second portion 139b of the exhaust gas flow channels 138 may be formed by a part of the heat exchanger core 132 disposed downstream of the diverter plate 119.

In some embodiments, a heat exchanger housing 134 may at least partially surround the heat exchanger core 132. The heat exchanger assembly 130 may be joined to the heat exchange conduit 115 of the valve housing 112 either by welding or by a bolted connection to form a relative seal at a resulting joint interface 140 between the heat exchanger assembly 130 and the valve housing 112. A gasket may be disposed between a shroud 116 of the heat exchange conduit 115 and a flange 136 of the heat exchanger housing 134 to reduce leakage therebetween. A gasket may not be necessary to seal the flange 136 to the shroud 116 if the joint interface 140 is sealed by welding. Using a bolted connection to join the shroud 116 and flange 136 may reduce any thermally induced stresses due to temperature differences between the heat exchanger assembly 130 and the valve housing 112.

Figure 7:
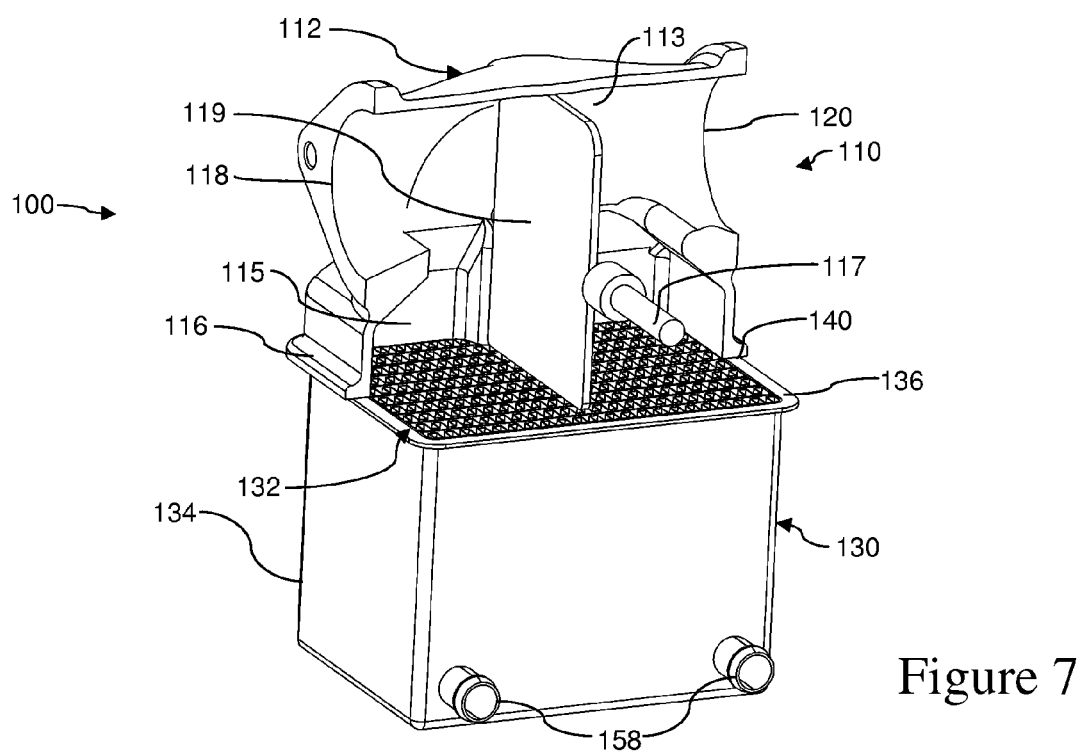
FIG. 7 is a partial cross-sectional perspective view of the exhaust heat recovery system of FIG. 6.
Figure 9:
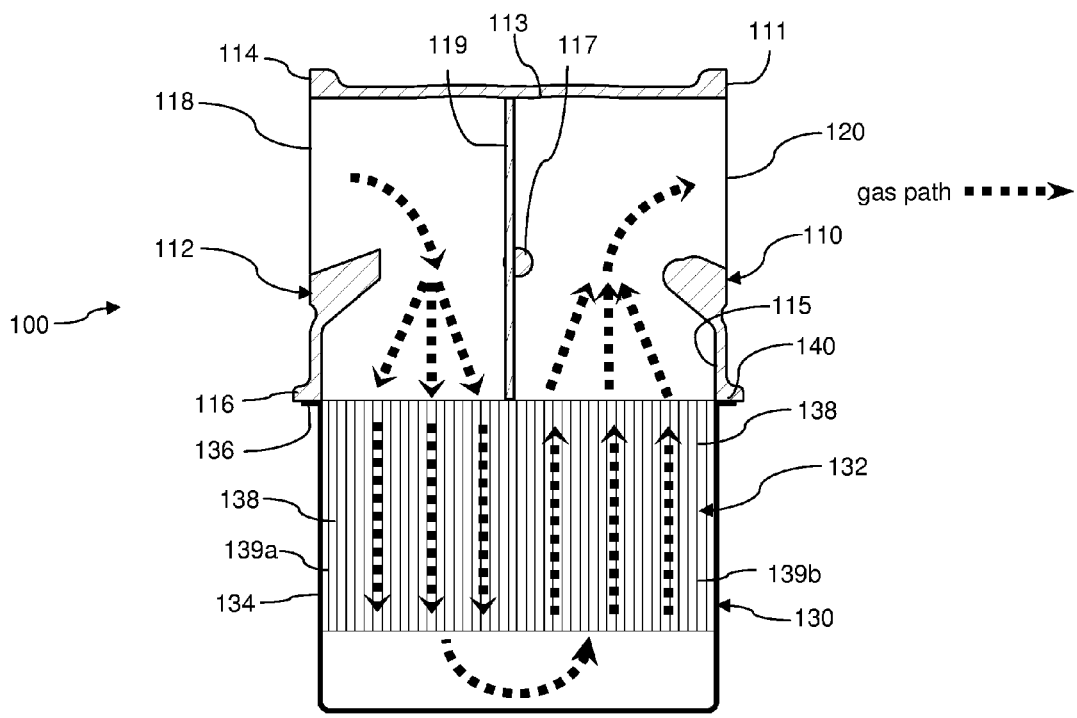
FIG. 9 is a cross-sectional view of the exhaust heat recovery system of FIG. 6 including the valve element shown in a heat-exchange position.

When the diverter plate 119 is in the heat-exchange position, as shown in FIGS. 7 and 9, exhaust gases may enter the valve housing 112 through the inlet opening 118 and may be routed into the exhaust gas flow channels 138 in the heat exchanger core 132 by the diverter plate 119. The exhaust gases may flow through the exhaust gas flow channels 138 in a generally U-shaped path and re-enter the valve housing 112 downstream of the valve diverter plate 119. After exiting the heat exchanger core 132 downstream of the valve diverter plate 119, the exhaust gases exit the valve housing 112 through the outlet opening 120 and continue downstream to the remainder of the exhaust system (not shown). A heat exchange fluid (e.g., a coolant, a refrigerant, a lubricant, or other fluid) may flow through pipes that may be coiled within the heat exchanger core 132 and absorb heat from the exhaust gas flowing through the exhaust gas flow channels 138. The heat exchange fluid may enter and exit the pipes through fittings 158. It will be appreciated that the heat exchanger core 132 could be a plate-style heat exchanger, a plate and fin type heat exchanger, or any other suitable type of heat exchanger.

Figure 8:
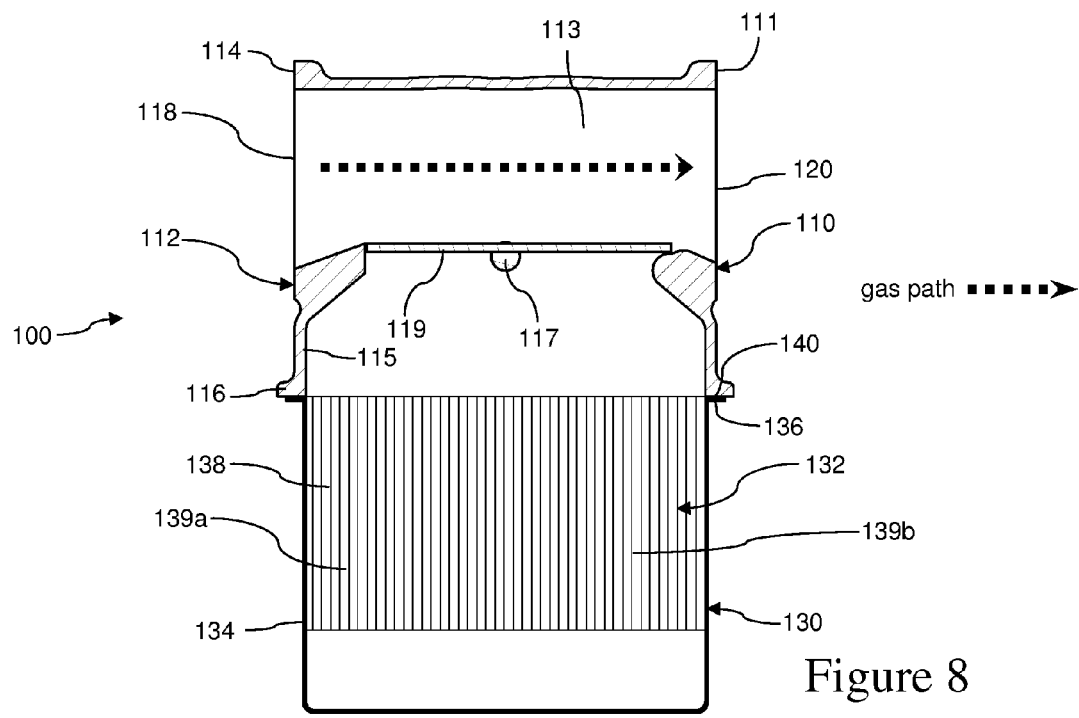
FIG. 8 is a cross-sectional view of the exhaust heat recovery system of FIG. 6 including a valve element shown in a bypass position.

When the valve diverter plate 119 is in the bypass position, as shown in FIG. 8, exhaust gases may enter the valve housing 112 through the inlet opening 118 and may flow through the bypass conduit 113 to bypass the heat exchanger assembly 130. In this operating mode, little or no heat will be transferred from the exhaust gas to the working fluid in the heat exchanger assembly 130.

An additional benefit of the EGHR system 100 is that the potential for internal exhaust gas leakage around the diverter plate 119 and through the heat exchanger core 132 is low when the diverter plate 119 is in the bypass position. This potential for internal leakage is low because the pressure drop through the bypass conduit 113 is minimal, thus minimizing the root cause that could drive unwanted flow past the diverter plate 119 and into the heat exchanger core 132. This internal flow leakage is undesirable because it would increase heat transfer between the exhaust gases and the heat exchanger working fluid when it is unwanted. Furthermore, if and when exhaust gases do leak past the valve diverter plate 119 and into the heat exchanger core 132 when the valve diverter plate 119 is in the bypass position, minimal unwanted heat transfer will result because the leaked gases may be prevented from flowing past the diverter plate 119 a second time to reach the outlet opening 120.

It will be appreciated that the diverter plate 119 can be positioned at any intermediate position between the bypass position and the heat exchange position. The control module can cause the actuator to adjust the position of the diverter plate 119 to allow varying percentages of the exhaust gas flow through the heat exchanger assembly 130. In this manner, the amount of heat exchange between the exhaust gas and the working fluid can be customized and adjusted based on operating conditions and parameters of the engine 6 and/or the vehicle systems.

The EGHR system 100 is shown in FIGS. 6-9 as an independent or self-contained system that can be inserted into an exhaust gas stream wherever there is sufficient packaging space. It should be noted that this EGHR system 100 can be integrated into other components in the exhaust system.

Figure 10:
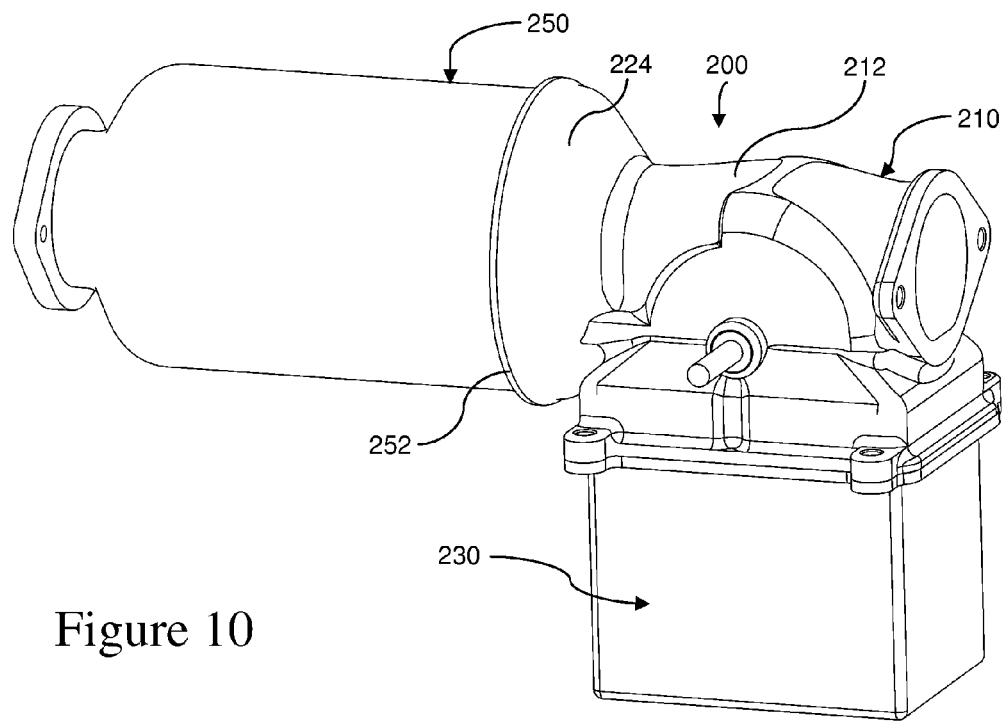
FIG. 10 is a perspective view of yet another exhaust heat recovery system associated with a catalytic converter according to the principles of the present disclosure.

With reference to FIG. 10, an EGHR system 200 is provided that may include a valve assembly 210 and a heat exchanger assembly 230. The valve assembly 210 and heat exchanger assembly 230 may be substantially similar to the valve assembly 110 and heat exchanger assembly 130 described above, except for any differences described below and/or shown in FIG. 10. Therefore, similar features and/or functionality will not be described again in detail.

The valve assembly 210 can be integrated with a catalytic converter assembly 250. A valve housing 212 of the valve assembly 210 may include an integrally formed cone 224 that joins to the catalytic converter assembly 250. A joint interface 252 between the valve housing 212 and the catalytic converter assembly 250 may be sealed either as a welded joint or as a bolted connection. The heat exchanger assembly 230 can be either welded or bolted to the valve housing 212, as described above. The EGHR system 200 can be disposed either upstream or downstream of the catalytic converter assembly 250.

Figure 11:
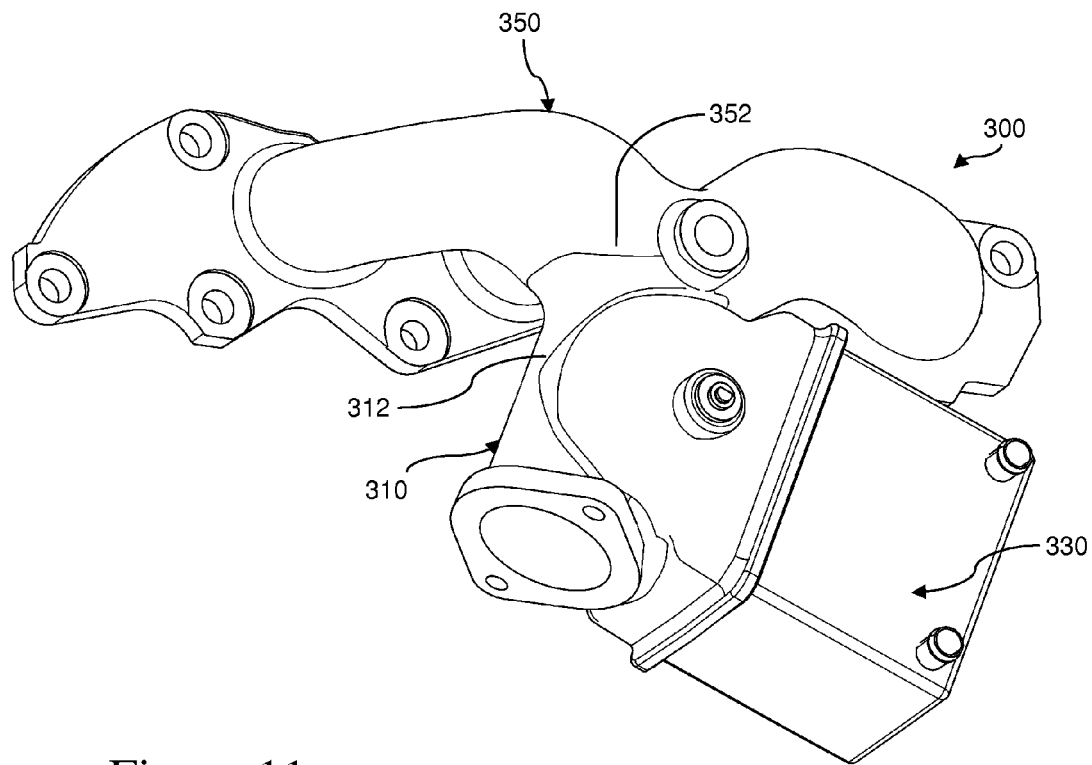
FIG. 11 is a perspective view of still another exhaust heat recovery system associated with an exhaust manifold according to the principles of the present disclosure.

With reference to FIG. 11, an EGHR system 300 is provided that may include a valve assembly 310 and a heat exchanger assembly 330. The valve assembly 310 and heat exchanger assembly 330 may be substantially similar to the valve assembly 110 and heat exchanger assembly 130 described above, except for any differences described below and/or shown in FIG. 11. Therefore, similar features and/or functionality will not be described again in detail.

The valve assembly 310 can be integrated with an exhaust manifold 350. A valve housing 312 of the valve assembly 310 may be integrally formed with an outlet 352 of the exhaust manifold 350. The heat exchanger assembly 330 can be either welded or bolted to the valve housing 312, as described above.

With reference to FIGS. 12-15, an EGHR system 400 is provided and may include a valve assembly 410 and a heat exchanger assembly 430. The valve assembly 410 and heat exchanger assembly 430 may be substantially similar to the valve assembly 110 and heat exchanger assembly 130 described above, except for any differences described below and/or shown in the figures. Therefore, similar features and/or functionality may not be described again in detail below.

The valve assembly 410 may include a valve housing 412, a valve shaft 417, and a valve diverter plate 419. The valve housing 412 may include an inlet opening 418, an outlet opening 420, a bypass conduit 413 that bypasses the heat exchanger assembly 430, and a heat exchange conduit 415 that communicates with the heat exchanger assembly 430. The valve shaft 417 may be mounted to the valve housing 412 for rotation about its longitudinal axis at or proximate a junction between the bypass conduit 413 and the heat exchange conduit 415.

Figure 12:
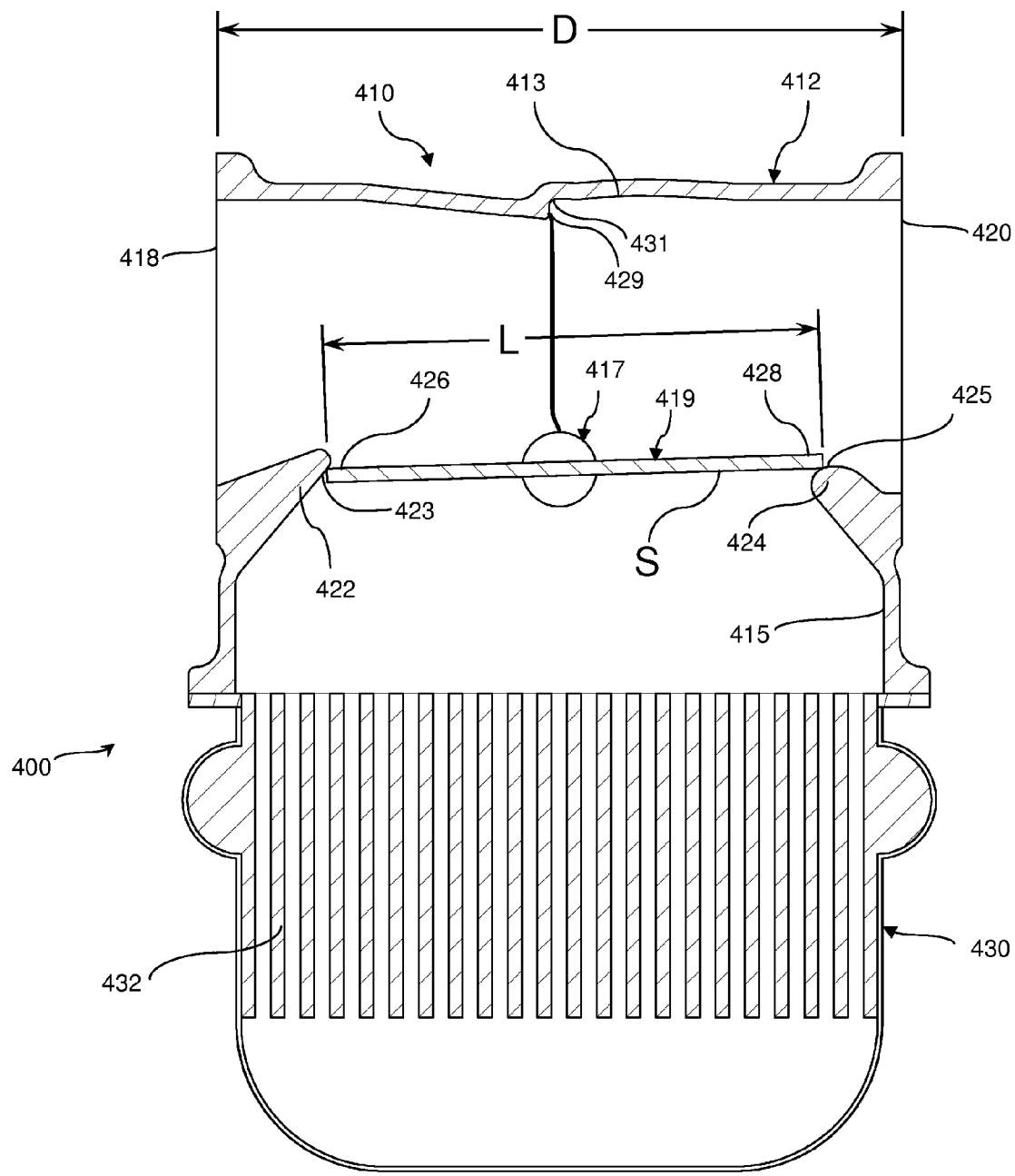
FIG. 12 is a cross-sectional view of still another exhaust heat recovery system including a valve element shown in a bypass position.

First and second lips or stops 422, 424 may define an opening in the valve housing 412 between the bypass and heat exchange conduits 413, 415. When the diverter plate 419 is in the bypass position, as shown in FIG. 12, a leading end 426 of the diverter plate 419 may abut a surface 423 of the first stop 422 that faces generally downstream in the heat exchange conduit 415, and a trailing end 428 may abut a surface 425 that generally faces the bypass conduit 413 and/or the outlet opening 420. This configuration may reduce or prevent leakage past the diverter plate 419 when the diverter plate 419 is in the bypass position. This is because the first stop 422 may direct the exhaust gas flow across and over a junction between the first stop 422 and the leading end 426 of the diverter plate 419, allowing minimal or no exhaust gas to leak therebetween. Any minimal amount of exhaust gas that is able to leak past the diverter plate 419 when the diverter plate 419 is in the bypass position will be unlikely to flow into the heat exchanger assembly 430 because there will be very little or no pressure differential that would cause any leaked exhaust gas to flow into the heat exchanger assembly 430. As the exhaust gas flows through the bypass conduit 413, the exhaust gas may exert a force downward (relative to the view shown in FIG. 12) on the trailing end 428 of the diverter plate 419, which may force the trailing end 428 into more intimate contact with the second stop 424. Furthermore, because the diverter plate 419 may be substantially parallel with the direction of exhaust gas flow through the bypass conduit 413 when the diverter plate 419 is in the bypass position, the diverter plate 419 causes relatively little or no flow restriction through the bypass conduit 413.

Furthermore, the substantial lack of leakage around the diverter plate 419 in the bypass position and the physical separation between the bypass conduit 413 and the heat exchanger assembly 430 allows the flow of exhaust gas entering the inlet opening 418 to flow through the valve housing 412 in a manner that substantially thermally isolates the exhaust gas from the working fluid in the heat exchanger assembly 430. Accordingly, very little or no heat transfer may occur therebetween in the bypass mode when such heat transfer may be undesirable. If any small amount of leakage past the diverter plate 419 were to occur when the diverter plate 419 is in the bypass position, the velocity of flow once the exhaust gas leaked past the diverter plate 419 would be very low and would be prevented or restricted from flowing into the heat exchanger assembly 430 or leaking past the diverter plate 419 a second time and reaching the outlet opening 420.

The geometry of the valve housing 412, and specifically the alignment between the inlet opening 418 and the bypass conduit 413 and the location of the diverter plate 419, allows the exhaust gas flowing into the valve housing 412 to exert a net torque on the diverter plate 419 that urges the diverter plate 419 toward the bypass position. This feature can act as a "fail safe" such that in the event that an actuator driving the valve shaft 417 fails (e.g., becomes disconnected from the valve shaft 417, loses electrical power, or otherwise becomes inoperable or unable to effectively control the diverter plate 419), the diverter plate 419 may move into the bypass position due to the net torque applied by the exhaust gas flow. The net torque applied by the exhaust gas flow also assists the actuator in moving the diverter plate 419 from the heat-exchange position to the bypass position. This may reduce an amount of torque that the actuator would otherwise need to exert and/or increase the speed at which the diverter plate 419 can be moved into the bypass position.

While the exhaust gas flow exerts a net torque on the diverter plate 419, the "butterfly" configuration of the diverter plate 419 may reduce the magnitude of this net torque as compared to a flap-type (or cantilevered) valve plate. Because the butterfly configuration provides the leading end 426 and the trailing end 428 on opposite sides of the valve shaft 417, the exhaust gas flow can apply forces to both the leading and trailing ends 426, 428 that counteract each other. While the force applied to the trailing end 428 may be greater than the force applied to the leading end 426 (and hence the net torque urging the diverter plate 419 toward the bypass position), the magnitude of the net torque may be less than if the diverter plate 419 extended radially outward from the valve shaft 417 in only one direction, as may be the case for a flap-type valve plate. This reduction in magnitude in the net torque applied by the exhaust gas flow reduces the force that the actuator would need to overcome the torque of the exhaust gas flow, thereby making the valve assembly 410 more efficient.

It will be appreciated that in some embodiments, there may be operating conditions or circumstances under which the exhaust gas will exert very little or no net torque on the diverter plate 419 or a torque urging the diverter plate 419 toward the heat exchange position. For example, in some embodiments, when a flow rate of exhaust gas through the EGHR system 400 is relatively low (e.g., when the engine 6 is operating at a low engine-speed), exhaust gas flowing through the EGHR system 400 may exert no net torque or relatively little net torque on the diverter plate 419. Additionally or alternatively, when the diverter plate 419 is in the heat exchange position (or near the heat exchange position) and the exhaust gas flow rate is relatively low, the exhaust gas may exert a net torque on the diverter plate 419 urging the diverter plate 419 in a counterclockwise direction (relative to the view shown in FIGS. 12 and 13). The relative positioning of the valve shaft 417 and the diverter plate 419 can be customized for a given application to customize and/or optimize a direction and magnitude of torque that will be applied to the diverter plate 419. For example, the valve assembly 410 could be designed such that the valve shaft 417 is positioned closer to one or the other of the leading and trailing ends 426, 428 of the diverter plate 419 to increase or decrease torque in a particular direction to suit a given application.

Figure 13:
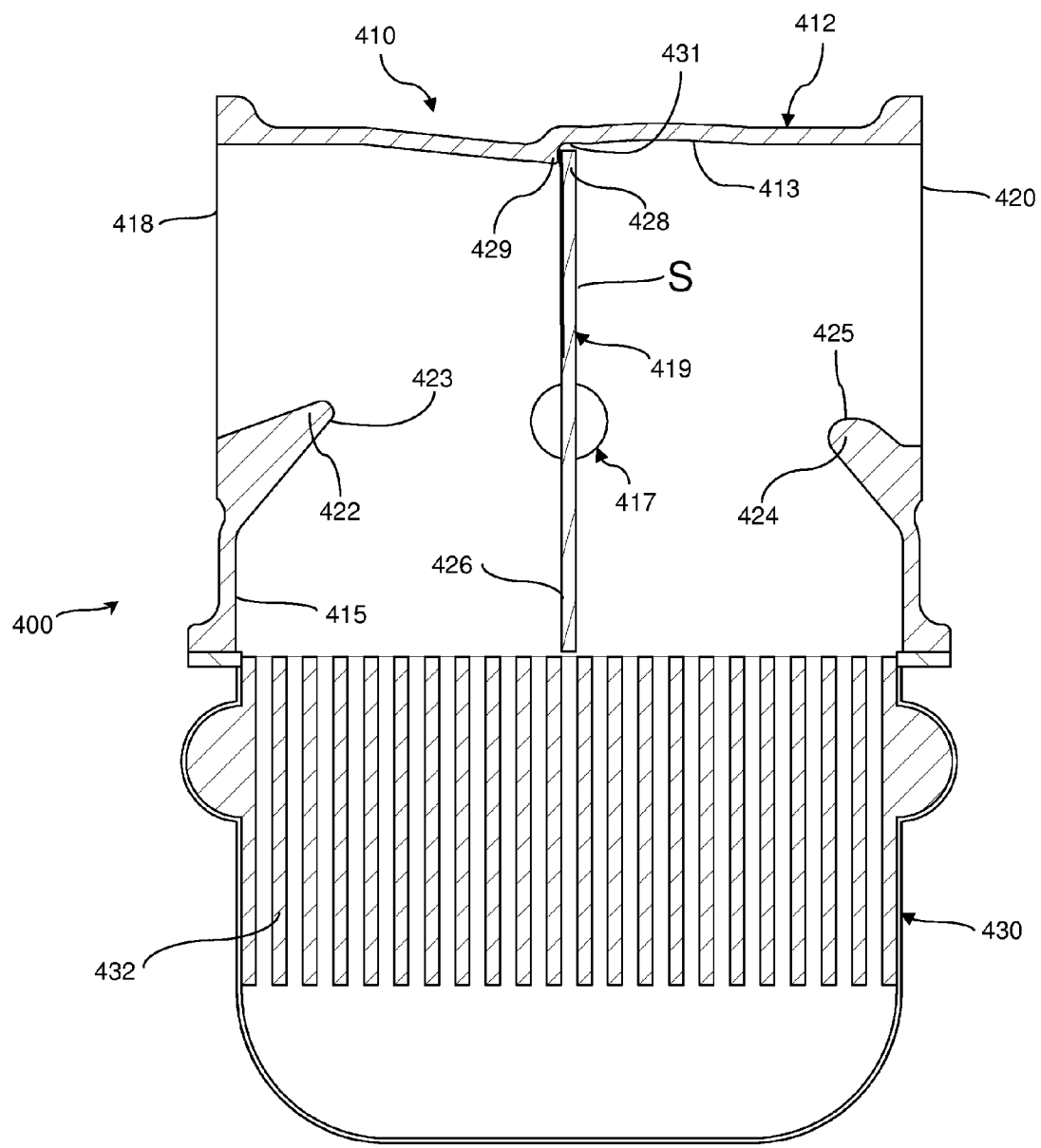
FIG. 13 is a cross-sectional view of the exhaust heat recovery system of FIG. 12 including the valve element shown in a heat-exchange position.

The actuator may exert a torque on the diverter plate 419 (either opposing or cooperating with any torque applied thereto by the flow of exhaust gas) to rotate the valve shaft 417 and diverter plate 419 in a counterclockwise direction (relative to the views shown in FIGS. 12 and 13) from the bypass position (FIG. 12) to the heat exchange position (FIG. 13). In the heat exchange position, the trailing end 428 of the diverter plate 419 may abut and substantially seal against a third lip or stop 429 formed in the bypass conduit 413. In this position, the exhaust gas entering the valve housing 412 through the inlet opening 418 is directed downward (relative to the view shown in FIG. 13) into the heat exchanger assembly 430.

Figure 15:
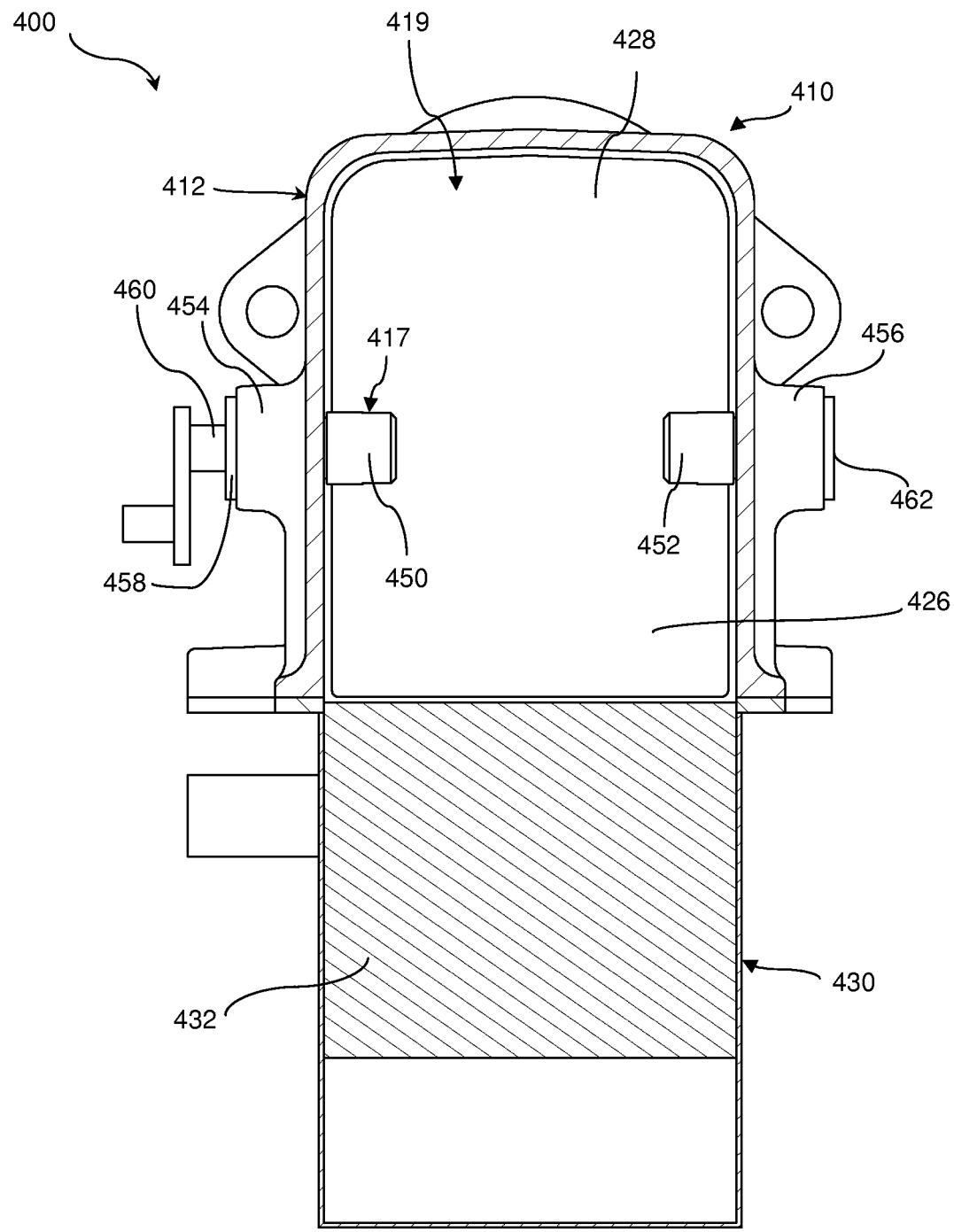
FIG. 15 is a yet another cross-sectional view of the exhaust heat recovery system of FIG. 12.

In addition to providing a positive stop, the third stop 429 also defines a recess 431 in the bypass conduit 413. When the diverter plate 419 is in the heat exchange position, the recess 431 provides a gap between a distal edge of the trailing end 428 and a wall of the bypass conduit 413. Additionally, diverter plate 419 and the heat exchange conduit 415 may be sized so that a gap exists between a distal edge of the leading end 426 and a heat exchanger core 432 of the heat exchanger assembly 430. These gaps (shown in FIG. 13) allow for thermal expansion of the diverter plate 419 relative to the valve housing 412 and the heat exchanger assembly 430 to accommodate for differing rates of thermal expansion of the diverter plate 419, valve housing 412 and the heat exchanger assembly 430 and to prevent binding of the diverter plate 419. The third stop 429 and recess 431 may extend around substantially the entire inner surface of the valve housing 412 surrounding the bypass and heat exchange conduits 413, 415 to provide a surface against which the diverter plate 419 may seal while also providing clearance between the diverter plate 419 and the inner surface of the valve housing 412 and three of the four sides of the diverter plate 419 to allow for thermal expansion, as shown in FIG. 15.

Figure 14:
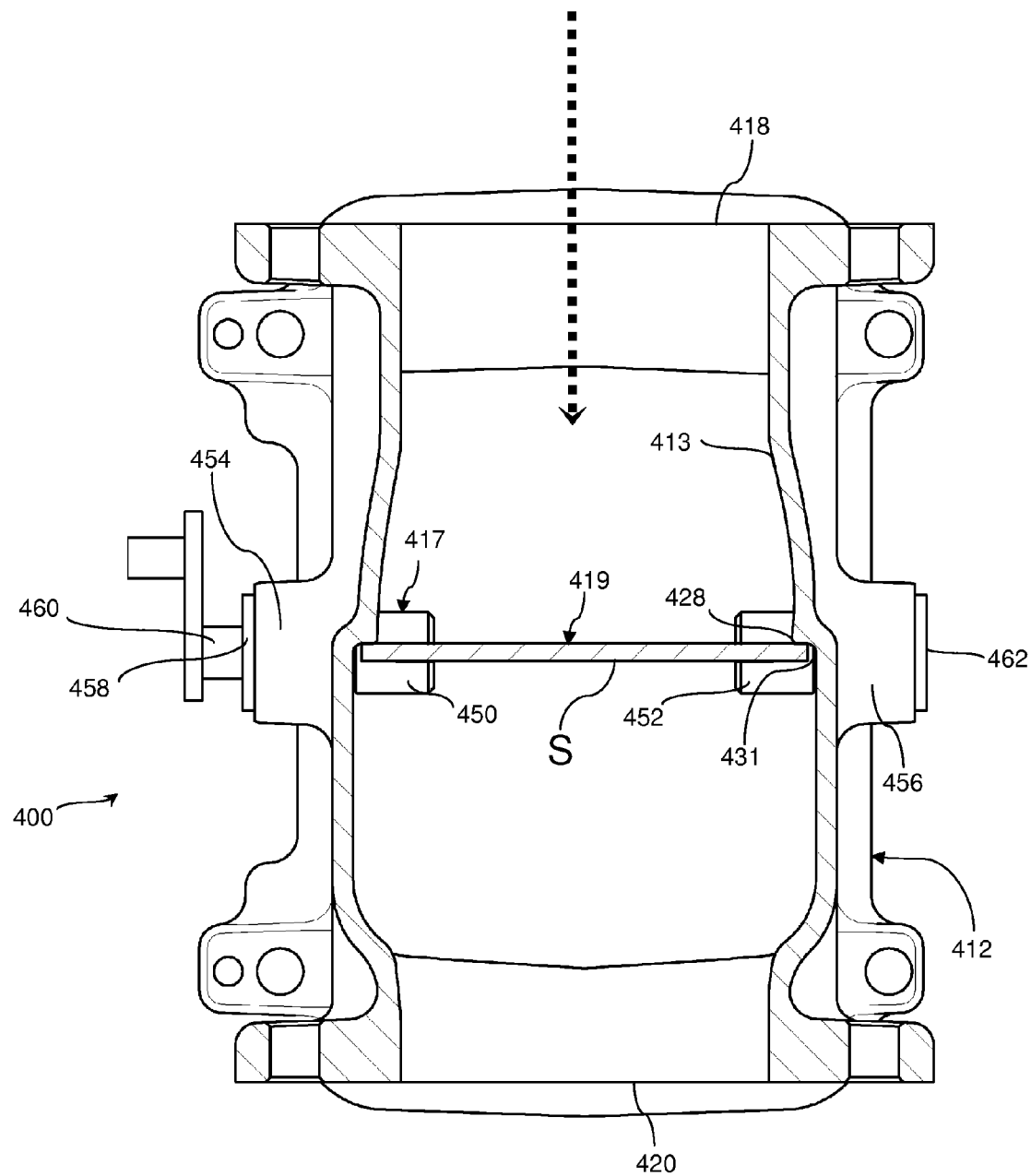
FIG. 14 is another cross-sectional view of the exhaust heat recovery system of FIG. 12.

The valve shaft 417 may include first and second discrete shaft portions 450, 452 extending into the valve housing 412. The first and second shaft portions 450, 452 support the diverter plate 419 and may be axially spaced apart from each other, as shown in FIG. 14. The first and second shaft portions 450, 452 may be rotatably supported by first and second bearing housings 454, 456, respectively, extending through opposing walls of the valve housing 412. Once the first shaft portion 450 is assembled in the first bearing housing 454, an annular seal member 458 may be installed in the first bearing housing 454 to seal the first bearing housing 454 and reduce or prevent exhaust gas from leaking out of the EGHR system 400 between the first bearing housing 454 and the first shaft portion 450. The annular seal member 458 may also seal against a surface 460 of the first shaft portion 450. Once the second shaft portion 452 is assembled in the second bearing housing 456, an end cap 462 may be welded or otherwise fixed to the exterior of the valve housing 412 to seal the second bearing housing 456 and prevent exhaust gas from leaking out of the EGHR system 400 therethrough. While the valve shaft 417 is described above as including the first and second discrete shaft portions 450, 452, in some embodiments, the valve shaft 417 may be a single, continuous shaft rotatably engaging both of the first and second bearing housings 454, 456.

The geometry and relative sizing of the valve housing 412 and the diverter plate 419 may allow the EGHR system 400 to be relatively compact in size and simple. For example, in some embodiments, a distance D between the inlet 418 and the outlet 420 may be less than about one-hundred-fifty percent of a length L of the diverter plate 419. In other embodiments, the valve housing 412 may be formed such that the distance D may be approximately equal to the length L. In any of the above embodiments, the relative short distance D may minimize a pressure drop in the EGHR system 400, thereby improving a flow rate therethrough. In some embodiments, a cross-sectional area of a flow path through which exhaust gas flows when the diverter plate 419 is in the bypass position may be approximately equal to half of a surface area of a surface S of the diverter plate 419 that faces the heat exchanger assembly 430 when the diverter plate 419 is in the bypass position. As shown in FIG. 13, an inlet into the heat exchange conduit 415 defined by the first stop 423 and the diverter plate 419 may have a cross-sectional area that is equal to about half of a surface area of the surface S. Likewise, an outlet from the heat exchange conduit 415 that is defined by the second stop 425 and the diverter plate 419 may also have a cross-sectional area that is equal to about half of the surface area of the surface S.

As shown in FIG. 13, the valve housing 412 may be shaped such that when the diverter plate 419 is in the heat-exchange position, the exhaust gas may be able to flow into substantially an entire interior volume of the valve housing 412, except for a volume occupied by the diverter plate 419 and the valve shaft 417. That is, when the diverter plate 419 is in the heat-exchange position, the path through which the exhaust gas will flow between the inlet 418 and the outlet 420 may be defined by bypass conduit 413 and the heat exchange conduit 415. Stated another way, the bypass conduit 413 becomes a part of the heat exchange conduit 415 when the diverter plate 419 is in the heat-exchange position. Therefore, substantially all of the bypass conduit 413 (except for the volume occupied by the diverter plate 419 and valve shaft 417) may be generally accessible when the diverter plate 419 is in the heat exchange position. Such a configuration may reduce an overall packaging volume of the EGHR system 400. As described above and illustrated in FIG. 12, the heat exchange conduit 415 may be substantially inaccessible to exhaust gas entering the inlet 418 when the diverter plate 419 is in the bypass position.

The EGHR system 400 may be installed in an exhaust system of a vehicle and may be disposed upstream or downstream of an exhaust component such as a catalytic converter, an $NO_x$ trap, or an exhaust manifold, for example, or any other exhaust component. Accordingly, in some embodiments, the EGHR system 400 may receive all of or substantially all of the exhaust gas that is discharged from the engine 6 into the inlet opening 418 (regardless of whether the diverter plate 419 is in the bypass position, the heat-exchange position or somewhere between these positions). As described above, all of, or nearly all of the exhaust gas that flows through the inlet opening 418 will exit the EGHR system 400 through the outlet opening 420 (regardless of whether the diverter plate 419 is in the bypass position, the heat-exchange position or somewhere between these positions) and continue on to the remainder of the exhaust system of the vehicle. By contrast, at low engine operating conditions, up to approximately fifty percent (50%) of the exhaust gas from an engine will pass through a typical exhaust gas recirculation (EGR) circuit. In typical operation, approximately five to fifteen percent (5-15%) of exhaust gas discharged from a gasoline engine or approximately twenty to thirty percent (20-30%) of exhaust gas discharged from a diesel engine may enter and exit a typical EGR system. Furthermore, the flow rate through an EGR system may be reduced when the engine is operating under loaded operating conditions. That is, the percentage of exhaust gas flowing into and out of a typical EGR system decreases as a load on the engine increases and/or engine speed increases. All of, or nearly all of the exhaust gas that is discharged from the engine 6 may flow into the inlet opening 418 and exit the EGHR system 400 through the outlet opening 420 under all operating conditions, loads or speeds. In embodiments where an EGR device is disposed upstream of the EGHR system 400, the inlet opening 418 may receive all of, or nearly all of, the exhaust gas that is discharged from the EGR device.

Furthermore, flow rates through the EGHR system 400 may be significantly higher than flow rates through typical EGR systems. For example, in some embodiments, a flow rate through the EGHR system 400 may be up to two-hundred kilograms per hour (200 kg/hr) when the diverter plate 419 is in the heat-exchange position, and up to five-hundred kilograms per hour (500 kg/hr) when the diverter plate 419 is in the bypass position. It will be appreciated that these flow rates are merely exemplary, and in some embodiments, the EGHR system 400 may accommodate higher or lower flow rates.

Figure 16:
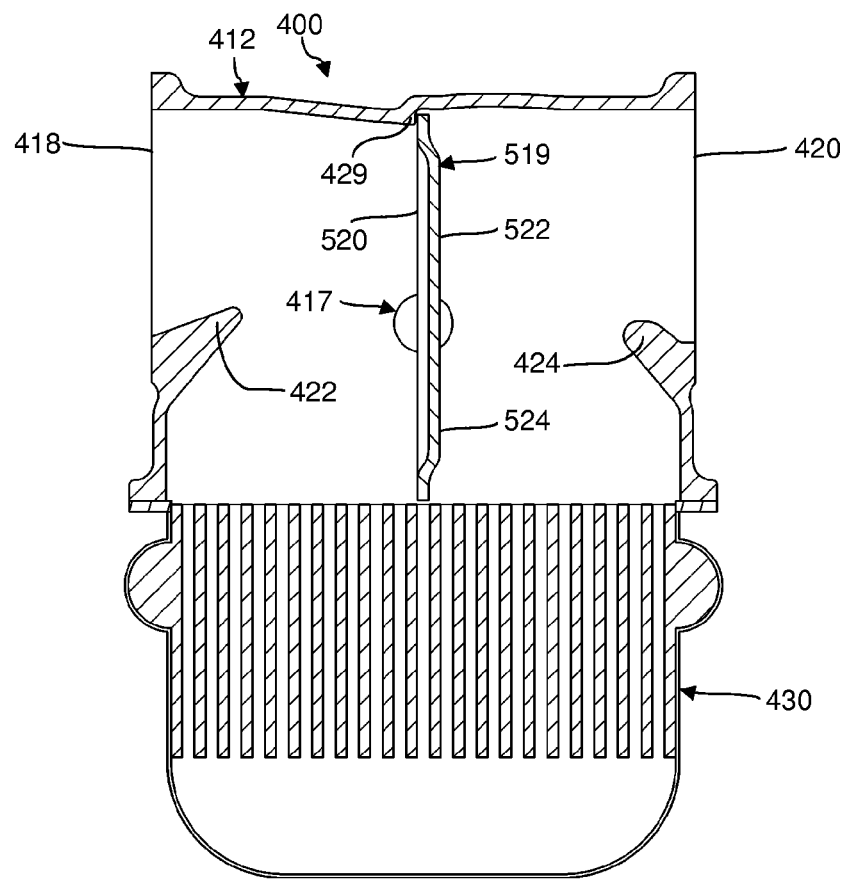
FIG. 16 is a cross-sectional view of the exhaust heat recovery system of FIG. 12 including a valve element having a reinforcement feature.
Figure 17:
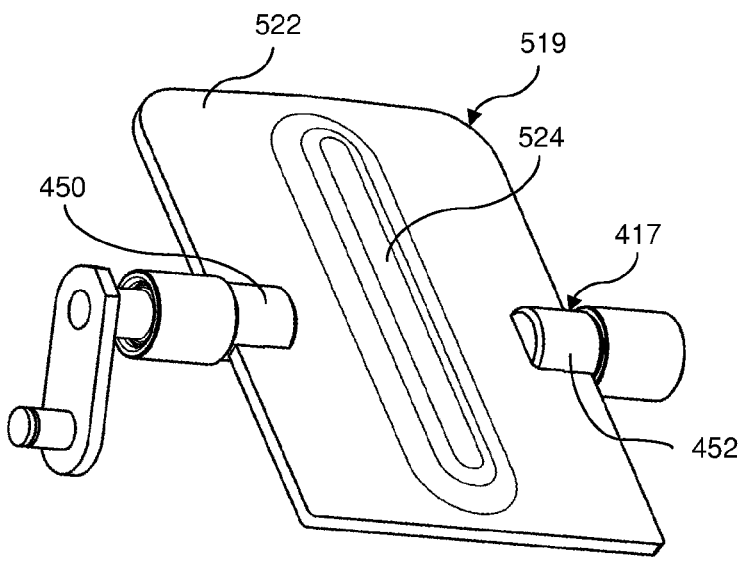
FIG. 17 is a perspective view of the valve element of FIG. 16.

With reference to FIGS. 16 and 17, another diverter plate 519 is provided. As shown in FIG. 16, the diverter plate 519 may be installed in the EGHR system 400 in the place of the diverter plate 419, for example. The diverter plate 519 may be substantially similar to the diverter plate 419, apart from any exceptions noted below and/or shown in the figures.

The diverter plate 519 may include first and second sides 520, 522 and may be attached to the valve shaft 417 for pivotable motion relative to the valve housing 412 between the bypass position and the heat exchange position (shown in FIG. 16). In the heat exchange position, the first side 520 of the diverter plate 519 may face the inlet opening 418 of the valve housing 412 and the second side 522 may face the outlet opening 420. The second side 522 may include one or more protrusions or ribs 524 formed thereon to structurally reinforce the diverter plate 519. In the particular embodiment depicted in FIGS. 16 and 17, the rib 524 may be disposed between first and second shaft portions 450, 452 of the valve shaft 417 and may extend across a substantial portion of a length of the diverter plate 519 between first and second shaft portions 450, 452 of the valve shaft 417. In other embodiments, the rib 524 may be shaped in any other configuration to provided sufficient stiffness and strength. The rib 524 may be stamped or otherwise formed into the diverter plate 519.

The rib 524 may increase a moment of inertia of the diverter plate 519 to resist bending loads applied to the diverter plate 519 by the flow of exhaust gas through the valve housing 412. This ensures proper seating of the diverter plate 519 against the first and second stops 422, 424 in the bypass position and proper seating of the diverter plate 519 against the third stop 429 in the heat exchange position under operating conditions whereby the exhaust gas is flowing through the EGHR system 400 at a relatively high temperature and/or flow rate. It will be appreciated that in some embodiments, the diverter plate 519 may include one or more other strengthening features in addition to or in the alternative to the one or more ribs 524 to withstand forces exerted by the flow of exhaust gas in a given application. In some embodiments, either of the diverter plates 419, 519 may be formed from a material that is sufficiently stiff to withstand bending forces at high exhaust gas temperatures and/or flow rates.

Figure 18:
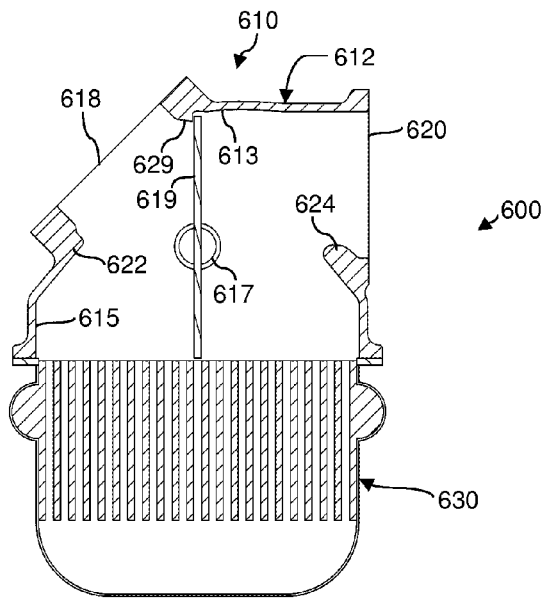
FIG. 18 is a cross-sectional view of still another exhaust heat recovery system according to the principles of the present disclosure.

With reference to FIG. 18, another EGHR system 600 is provided that may include a valve assembly 610 and a heat exchanger assembly 630. The valve assembly 610 and heat exchanger assembly 630 may be substantially similar to the valve assembly 410 and heat exchanger assembly 430 described above, except for any differences described below and/or shown in the figures. Therefore, similar features and/or functionality may not be described again in detail below.

The valve assembly 610 may include a valve housing 612, a valve shaft 617, and a valve diverter plate 619. The valve housing 612 may include an inlet opening 618, an outlet opening 620, a bypass conduit 613 that bypasses the heat exchanger assembly 630, and a heat exchange conduit 615 that communicates with the heat exchanger assembly 630. The valve shaft 617 may be mounted to the valve housing 612 for rotation about its longitudinal axis at or proximate a junction between the bypass conduit 613 and the heat exchange conduit 615.

In the particular embodiment shown in FIG. 18, the inlet opening 618 is axially misaligned or off-axis relative to the outlet opening 620. The inlet opening 618 may be disposed at a non-perpendicular angle relative to the diverter plate 619 when the diverter plate 619 is in the heat exchange position. This orientation of the inlet opening 618 may provide a straighter flow path into the heat exchanger assembly 630, which may decrease the pressure drop of the exhaust gas through the EGHR system 600 in the heat exchange mode. The relative positioning of the inlet opening 618 and/or the outlet opening 620 may be customized for a given application based on the particular routing and/or configurations of the components to which the valve housing 612 is fluidly coupled and/or any packaging constraints for a given application. It will be appreciated that in some embodiments, the inlet opening 618 could be substantially parallel to the relative to the orientation of the diverter plate 619 in the heat exchange position and the outlet opening 620 may be disposed at a perpendicular or non-perpendicular angle relative to the orientation of the diverter plate 619 in the heat exchange position.

Similar to the valve housing 412, the valve housing 612 may include first, second and third lips or stops 622, 624, 629. As shown in FIG. 18, the diverter plate 619 may be seated against the third stop 629 in the heat exchange position. In the bypass position, the diverter plate 619 may be seated against the first and second stops 622, 624.

Figure 19:
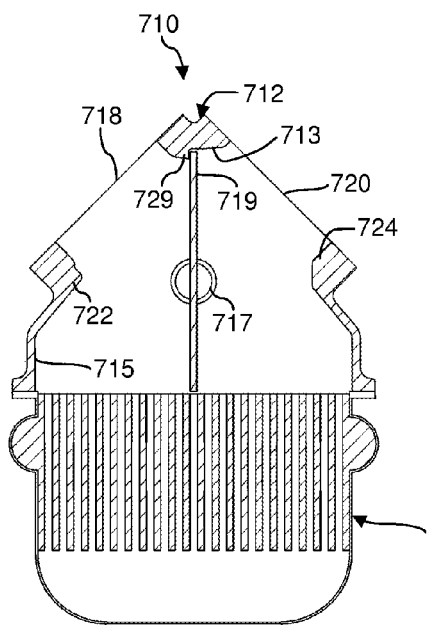
FIG. 19 is a cross-sectional view of still another exhaust heat recovery system according to the principles of the present disclosure.

With reference to FIG. 19, another EGHR system 700 is provided that may include a valve assembly 710 and a heat exchanger assembly 730. The valve assembly 710 and heat exchanger assembly 730 may be substantially similar to the valve assembly 410 and heat exchanger assembly 430 described above, except for any differences described below and/or shown in the figures. Therefore, similar features and/or functionality may not be described again in detail below.

The valve assembly 710 may include a valve housing 712, a valve shaft 717, and a valve diverter plate 719. The valve housing 712 may include an inlet opening 718, an outlet opening 720, a bypass conduit 713 that bypasses the heat exchanger assembly 730, and a heat exchange conduit 715 that communicates with the heat exchanger assembly 730. The valve shaft 717 may be mounted to the valve housing 712 for rotation about its longitudinal axis at or proximate a junction between the bypass conduit 713 and the heat exchange conduit 715.

In the particular embodiment shown in FIG. 19, the inlet opening 718 is axially misaligned or off-axis relative to the outlet opening 720. The inlet opening 718 may be disposed at a non-perpendicular angle relative to the diverter plate 719 when the diverter plate 719 is in the heat exchange position. The outlet opening 720 may be disposed at a non-perpendicular angle relative to the inlet opening 718 and the orientation of the diverter plate 719 in the heat exchange position. This orientation of the inlet opening 718 and outlet opening 720 may provide a straighter flow path into and out of the heat exchanger assembly 730, which may decrease the pressure drop of the exhaust gas through the EGHR system 700 in the heat exchange mode.

Similar to the valve housing 412, the valve housing 712 may include first, second and third lips or stops 722, 724, 729. As shown in FIG. 19, the diverter plate 719 may be seated against the third stop 729 in the heat exchange position. In the bypass position, the diverter plate 719 may be seated against the first and second stops 722, 724.

Figure 20:
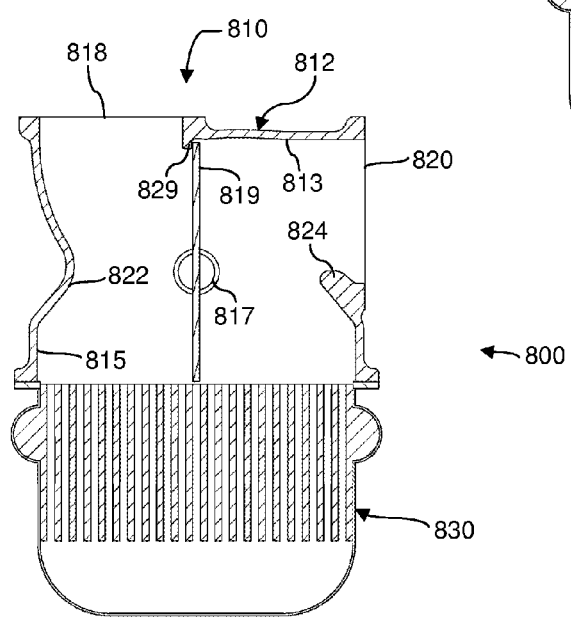
FIG. 20 is a cross-sectional view of still another exhaust heat recovery system according to the principles of the present disclosure.

With reference to FIG. 20, another EGHR system 800 is provided that may include a valve assembly 810 and a heat exchanger assembly 830. The valve assembly 810 and heat exchanger assembly 830 may be substantially similar to the valve assembly 410 and heat exchanger assembly 430 described above, except for any differences described below and/or shown in the figures. Therefore, similar features and/or functionality may not be described again in detail below.

The valve assembly 810 may include a valve housing 812, a valve shaft 817, and a valve diverter plate 819. The valve housing 812 may include an inlet opening 818, an outlet opening 820, a bypass conduit 813 that bypasses the heat exchanger assembly 830, and a heat exchange conduit 815 that communicates with the heat exchanger assembly 830. The valve shaft 817 may be mounted to the valve housing 812 for rotation about its longitudinal axis at or proximate a junction between the bypass conduit 813 and the heat exchange conduit 815.

In the particular embodiment shown in FIG. 20, the inlet opening 818 is axially misaligned or off-axis relative to the outlet opening 820. The inlet opening 818 may be substantially perpendicular relative to the diverter plate 819 when the diverter plate 819 is in the heat exchange position. This orientation of the inlet opening 818 may provide a straighter flow path into the heat exchanger assembly 830, which may decrease the pressure drop of the exhaust gas through the EGHR system 800 in the heat exchange mode.

It will be appreciated that in some embodiments, the outlet opening 820 may be substantially perpendicular relative to the orientation of the diverter plate 819 in the heat exchange position. In such embodiments, the inlet opening 818 could be substantially parallel, perpendicular or otherwise angled relative to the orientation of the diverter plate 819 in the heat exchange position.

Similar to the valve housing 412, the valve housing 812 may include first, second and third lips or stops 822, 824, 829. As shown in FIG. 20, the diverter plate 819 may be seated against the third stop 829 in the heat exchange position. In the bypass position, the diverter plate 819 may be seated against the first and second stops 822, 824.

While the following examples and discussion generally relate to exhaust gas heat recovery applications, the general concepts discussed herein are also applicable to other "exhaust applications" such as thermal protection of exhaust components, or EGR systems, for example. The principles of the present disclosure can be employed in exhaust systems associated with internal or external combustion systems for stationary or transportation applications. It will be appreciated that an assembly including the valve housings and heat exchangers described above may be used to transfer heat directly or indirectly between other fluids in other applications (e.g., charge air heating applications, lubricant heating and/or cooling applications, etc.). Therefore, the principles of the present disclosure are not limited in application to transferring heat from engine exhaust gas to a working fluid. In some embodiments, the valve assembly and heat exchanger could be used to transfer heat between a working fluid and ambient air or air to be drawn into an engine for combustion.

In some embodiments, the EGHR systems 10, 100, 200, 300, 400, 600, 700, 800 may be configured to transfer heat from exhaust gases directly or indirectly to additional or alternative vehicle fluids, such as a hydraulic fluid or a lubricant for an engine, a transmission, an axle, and/or a differential, for example, and/or any other fluid. For example, a lubricant or other fluid may flow into the heat exchanger core 432 of the heat exchanger assembly 430 to absorb heat from the exhaust gas when the diverter plate 419 is not in the bypass position. In this manner, the EGHR system 10, 100, 200, 300, 400, 600, 700, 800 may transfer heat from exhaust gas to the lubricant and/or other fluid to optimize a viscosity of the fluid, for example, to improve the performance and/or fuel-economy of the vehicle.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust gas heat recovery system comprising:
a housing including an inlet, an outlet, a first exhaust gas pathway in communication with the inlet and the outlet, and a second exhaust gas pathway in communication with the inlet and the outlet;
a valve member disposed within the housing and movable between a first position allowing fluid flow through the first exhaust gas pathway and substantially preventing fluid flow through the second exhaust gas pathway and a second position allowing fluid flow through the second exhaust gas pathway; and
a heat exchanger in communication with the second exhaust gas pathway and including a conduit having a fluid flowing therein, the fluid being in thermal communication with exhaust gas in the heat exchanger when the valve member is in the second position and substantially thermally isolated from the exhaust gas when the valve member is in the first position, the heat exchanger being substantially fluidly isolated from the first exhaust gas pathway when the valve member is in the first position, and the valve member guides fluid flow in a U-shaped flow path through the heat exchanger when the valve member is in the second position, wherein the valve member substantially blocks flow paths into and out of the second exhaust gas pathway when the valve member is in the first position, wherein the housing includes a heat exchange conduit extending between a shaft of the valve member and the heat exchanger, the heat exchange conduit being entirely open and free from obstructions between the shaft and the heat exchanger when the valve member is in the first position, and wherein an opening of the heat exchange conduit is divided only by the valve member when the valve member is in the second position, wherein the valve member is positioned within the housing such that fluid flow through the inlet while the valve member is in the second position biases the valve member toward the first position and fluid flow through the inlet while the valve member is in the first position restricts movement of the valve member toward the second position.

2. The exhaust gas heat recovery system of claim 1, wherein the inlet and outlet are in communication with an exhaust manifold associated with an engine and substantially all of the exhaust gas that flows through the exhaust manifold flows through the inlet and the outlet.

3. The exhaust gas heat recovery system of claim 1, wherein the valve member includes a first end portion, a second end portion, and an intermediate portion therebetween, the valve member being attached at the intermediate portion to the shaft for rotation therewith.

4. The exhaust gas heat recovery system of claim 1, wherein the inlet, the outlet and the first exhaust gas pathway are substantially axially aligned with each other such that fluid flows in a straight linear flow path from the inlet to the outlet when the valve member is in the first position.

5. The exhaust gas heat recovery system of claim 4, wherein the valve member at least partially defines a substantially U-shaped flow path through the heat exchanger when the valve member is in the second position, and wherein the valve member defines an inlet into the U-shaped flow path and an outlet out of the U-shaped flow path when the valve member is in the second position.

6. The exhaust gas heat recovery system of claim 1, wherein the housing includes a first stop member contacting a leading end of the valve member when the valve member is in the first position and a second stop member contacting a trailing end of the valve member when the valve member is in the first position, the leading end contacting a surface of the first stop member that faces generally away from the first exhaust gas pathway.

7. The exhaust gas heat recovery system of claim 6, wherein the housing includes a third stop member contacting the trailing end of the valve member when the valve member is in the second position.

8. The exhaust gas heat recovery system of claim 1, wherein a gap exists between a plurality of edges of the valve member and an inner surface of the housing to prevent the valve member from binding after thermal expansion of the valve member relative to the housing.

9. The exhaust gas heat recovery system of claim 1, wherein the housing defines a bearing housing supporting the shaft upon which the valve member rotates, and wherein the bearing housing includes an end cap is attached thereto to seal the bearing housing and prevent exhaust gas from leaking out of the bearing housing.

10. The exhaust gas heat recovery system of claim 1, wherein a distance between the inlet and the outlet is less than one-hundred-fifty percent of a length of the valve member.

11. The exhaust gas heat recovery system of claim 1, wherein a cross-sectional flow area of the first exhaust gas pathway is approximately half of an area of a surface of the valve member that faces the heat exchanger assembly when the valve member is in the first position.

12. The exhaust gas heat recovery system of claim 1, wherein the first exhaust gas pathway partially defines the second exhaust gas pathway when the valve member is in the second position.

13. The exhaust gas heat recovery system of claim 12, wherein the housing is configured such that when the valve member is in the second position, an exhaust gas is able to flow into substantially an entire volume of the second exhaust gas pathway and substantially an entire volume of the first exhaust gas pathway less a volume of a portion of the valve member that extends into the first exhaust gas pathway when the valve member is in the second position.

14. The exhaust gas heat recovery system of claim 1, wherein the fluid flowing through the conduit includes at least one of a coolant and a lubricant.

15. An exhaust gas heat recovery system comprising:
a housing including an inlet, an outlet, a first exhaust gas pathway in communication with the inlet and the outlet, and a second exhaust gas pathway in communication with the inlet and the outlet;
a valve member disposed within the housing and movable between a first position allowing fluid flow through the first exhaust gas pathway and a second position allowing fluid flow through the second exhaust gas pathway; and
a heat exchanger in communication with the second exhaust gas pathway and including a conduit having a fluid flowing therein, the fluid being in thermal communication with exhaust gas in the heat exchanger when the valve member is in the second position, and the valve member guides fluid flow in a U-shaped flow path through the heat exchanger when the valve member is in the second position, wherein the housing includes a first stop member contacting a leading end of the valve member when the valve member is in the first position and a second stop member contacting a trailing end of the valve member when the valve member is in the first position, the leading end contacting a surface of the first stop member that faces generally away from the first exhaust gas pathway, wherein the valve member substantially blocks flow paths into and out of the second exhaust gas pathway when the valve member is in the first position, wherein the housing includes a heat exchange conduit extending between a shaft of the valve member and the heat exchanger, the heat exchange conduit being entirely open and free from obstructions between the shaft and the heat exchanger when the valve member is in the first position, and wherein an opening of the heat exchange conduit is divided only by the valve member when the valve member is in the second position, wherein the valve member is positioned within the housing such that fluid flow through the inlet while the valve member is in the second position biases the valve member toward the first position and fluid flow through the inlet while the valve member is in the first position restricts movement of the valve member toward the second position.

16. The exhaust gas heat recovery system of claim 15, wherein the inlet and outlet are in communication with an exhaust manifold associated with an engine and substantially all of the exhaust gas that flows through the exhaust manifold flows through the inlet and the outlet.

17. The exhaust gas heat recovery system of claim 15, wherein the valve member includes a first end portion, a second end portion, and an intermediate portion therebetween, the valve member being attached at the intermediate portion to the shaft for rotation therewith.

18. The exhaust gas heat recovery system of claim 15, wherein the housing includes a third stop member contacting the trailing end of the valve member when the valve member is in the second position.

19. The exhaust gas heat recovery system of claim 15, wherein the inlet, the outlet and the first exhaust gas pathway are substantially axially aligned with each other such that fluid flows in a straight linear flow path from the inlet to the outlet when the valve member is in the first position.

20. The exhaust gas heat recovery system of claim 19, wherein the fluid is substantially thermally isolated from the exhaust gas when the valve member is in the first position, the heat exchanger being substantially sealed from the first exhaust gas pathway when the valve member is in the first position.

21. The exhaust gas heat recovery system of claim 15, wherein a gap exists between a plurality of edges of the valve member and an inner surface of the housing to prevent the valve member from binding after thermal expansion of the valve member relative to the housing.

22. The exhaust gas heat recovery system of claim 15, wherein a distance between the inlet and the outlet is less than one-hundred-fifty percent of a length of the valve member.

23. The exhaust gas heat recovery system of claim 15, wherein a cross-sectional flow area of the first exhaust gas pathway is approximately half of an area of a surface of the valve member that faces the heat exchanger assembly when the valve member is in the first position.

24. The exhaust gas heat recovery system of claim 15, wherein the first exhaust gas pathway partially defines the second exhaust gas pathway when the valve member is in the second position.

25. The exhaust gas heat recovery system of claim 24, wherein the housing is configured such that when the valve member is in the second position, an exhaust gas is able to flow into substantially an entire volume of the second exhaust gas pathway and substantially an entire volume of the first exhaust gas pathway less a volume of a portion of the valve member that extends into the first exhaust gas pathway when the valve member is in the second position.

26. The exhaust gas heat recovery system of claim 15, wherein the fluid flowing through the conduit includes at least one of a coolant and a lubricant.

27. An exhaust gas heat recovery system comprising:
a housing including an inlet, an outlet, a first exhaust gas pathway in communication with the inlet and the outlet, and a second exhaust gas pathway in communication with the inlet and the outlet, the first exhaust gas pathway being substantially aligned with the inlet and the outlet to define a substantially linear flow path therethrough;
a valve member disposed within the housing and movable between a first position allowing fluid flow through the first exhaust gas pathway and a second position allowing fluid flow through the second exhaust gas pathway; and a heat exchanger in communication with the second exhaust gas pathway and including a conduit having a fluid flowing therein, the fluid being in thermal communication with exhaust gas in the heat exchanger when the valve member is in the second position,
wherein the valve member at least partially defines a substantially U-shaped flow path through the heat exchanger when the valve member is in the second position, the valve member defining an inlet into the U-shaped flow path and an outlet out of the U-shaped flow path when the valve member is in the second position,
wherein the heat exchanger is substantially sealed from the first exhaust gas pathway when the valve member is in the first position,
wherein the housing includes a heat exchange conduit extending between a shaft of the valve member and the heat exchanger, the heat exchange conduit being entirely open and free from obstructions between the shaft and the heat exchanger when the valve member is in the first position, and wherein an opening of the heat exchange conduit is divided only by the valve member when the valve member is in the second position,
wherein the valve member is positioned within the housing such that fluid flow through the inlet while the valve member is in the second position biases the valve member toward the first position and fluid flow through the inlet while the valve member is in the first position restricts movement of the valve member toward the second position.

28. The exhaust gas heat recovery system of claim 27, wherein the fluid is substantially thermally isolated from the exhaust gas when the valve member is in the first position.

29. The exhaust gas heat recovery system of claim 27, wherein the housing includes a first stop member contacting a leading end of the valve member when the valve member is in the first position and a second stop member contacting a trailing end of the valve member when the valve member is in the first position, the leading end contacting a surface of the first stop member that faces generally away from the first exhaust gas pathway.

30. The exhaust gas heat recovery system of claim 27, wherein the housing is configured such that when the valve member is in the second position, an exhaust gas is able to flow into substantially an entire volume of the second exhaust gas pathway and substantially an entire volume of the first exhaust gas pathway less a volume of a portion of the valve member that extends into the first exhaust gas pathway when the valve member is in the second position.

31. The exhaust gas heat recovery system of claim 30, wherein a distance between the inlet and the outlet is less than one-hundred-fifty percent of a length of the valve member, and wherein the inlet, the outlet and the first exhaust gas pathway are substantially axially aligned with each other such that fluid flows in a straight linear flow path from the inlet to the outlet when the valve member is in the first position.

32. The exhaust gas heat recovery system of claim 27, wherein the fluid flowing through the conduit includes at least one of a coolant and a lubricant.

33. The exhaust gas heat recovery system of claim 1, wherein the valve shaft of the valve member defines an axis of rotation of the valve member for rotation between the first and second positions, and wherein the valve member includes a rib that extends longitudinally in a direction perpendicular to the rotational axis.

* * * * *